United States Patent
Katoh et al.

(10) Patent No.: US 10,759,257 B2
(45) Date of Patent: Sep. 1, 2020

(54) REFRIGERATION CYCLE DEVICE

(71) Applicant: DENSO CORPORATION, Kariya, Aichi-pref. (JP)

(72) Inventors: Yoshiki Katoh, Kariya (JP); Koji Miura, Kariya (JP); Kengo Sugimura, Kariya (JP); Masayuki Takeuchi, Kariya (JP); Keigo Satou, Kariya (JP); Norihiko Enomoto, Kariya (JP); Nobuyuki Hashimura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 80 days.

(21) Appl. No.: 15/743,311

(22) PCT Filed: Jun. 21, 2016

(86) PCT No.: PCT/JP2016/068316
§ 371 (c)(1),
(2) Date: Jan. 10, 2018

(87) PCT Pub. No.: WO2017/010239
PCT Pub. Date: Jan. 19, 2017

(65) Prior Publication Data
US 2018/0201098 A1     Jul. 19, 2018

(30) Foreign Application Priority Data

Jul. 14, 2015 (JP) .................................. 2015-140358
May 20, 2016 (JP) .................................. 2016-101482

(51) Int. Cl.
*B60H 1/32* (2006.01)
*B60H 1/00* (2006.01)
(Continued)

(52) U.S. Cl.
CPC ....... *B60H 1/3216* (2013.01); *B60H 1/00007* (2013.01); *B60H 1/00328* (2013.01);
(Continued)

(58) Field of Classification Search
CPC ........ B60H 1/00; B60H 1/32; B60H 1/00328; B60H 1/3233; B60H 1/32284; B60H 3/06;
(Continued)

(56) References Cited

U.S. PATENT DOCUMENTS 5,289,698 A * 3/1994 Garimella .......... B60H 1/00007
                                              62/498
8,250,874 B2 * 8/2012 Ikegami ............. B60H 1/00335
                                              62/196.4
(Continued)

FOREIGN PATENT DOCUMENTS

JP     H07055232 A    3/1995
JP     2014000906 A   1/2014
(Continued)

OTHER PUBLICATIONS

NPL1-Refrigeration Cycle-Condenser Operation (Year: 2014).*

*Primary Examiner* — Nelson J Nieves
*Assistant Examiner* — Meraj A Shaikh
(74) *Attorney, Agent, or Firm* — Harness, Dickey & Pierce, P.L.C.

(57) ABSTRACT

A refrigeration cycle device includes a compressor, an air-refrigerant heat exchanger that exchanges heat between air and refrigerant, an expansion valve decompressing the refrigerant, a heat medium-refrigerant heat exchanger that exchanges heat between a heat medium and the refrigerant, a cold-heat utilization device that utilizes cold heat of the heat medium, and a hot-heat utilization device that utilizes hot heat of the heat medium. A refrigerant flow switching (Continued)

valve is provided to switch between a heat-medium cooling mode of cooling the heat medium in the heat medium-refrigerant heat exchanger, and a heat-medium heating mode of heating the heat medium in the heat medium-refrigerant heat exchanger. In addition, a heat medium flow switching device is provided such that, in the heat-medium cooling mode, the heat medium circulates between the heat medium-refrigerant heat exchanger and the cold-heat utilization device, and that in the heat-medium heating mode, the heat medium circulates between the heat medium-refrigerant heat exchanger and the hot-heat utilization device.

21 Claims, 24 Drawing Sheets

(51) Int. Cl.
  *F25B 13/00*    (2006.01)
  *F25B 5/04*    (2006.01)
  *F25B 6/04*    (2006.01)
  *F25B 39/00*    (2006.01)
  *F25B 47/02*    (2006.01)

(52) U.S. Cl.
  CPC ....... B60H 1/00907 (2013.01); B60H 1/3213 (2013.01); F25B 5/04 (2013.01); F25B 6/04 (2013.01); F25B 13/00 (2013.01); F25B 39/00 (2013.01); F25B 47/02 (2013.01); *B60H 2001/00935* (2013.01); *B60H 2001/00957* (2013.01); *F25B 2313/003* (2013.01); *F25B 2313/021* (2013.01); *F25B 2313/0254* (2013.01); *F25B 2313/02742* (2013.01)

(58) Field of Classification Search
  CPC .......... F25B 2339/045; F25B 2339/022; F25B 2339/02424
  See application file for complete search history.

(56) References Cited

U.S. PATENT DOCUMENTS

| | | | | |
|---|---|---|---|---|
| 2009/0241573 | A1* | 10/2009 | Ikegami | B60H 1/00335 62/238.7 |
| 2011/0005268 | A1* | 1/2011 | Oshitani | F25B 41/00 62/500 |
| 2012/0222446 | A1* | 9/2012 | Sekiya | B60H 1/00385 62/498 |
| 2014/0216083 | A1* | 8/2014 | Morimoto | F25B 13/00 62/151 |
| 2014/0374081 | A1* | 12/2014 | Kakehashi | B60K 11/02 165/202 |
| 2015/0151609 | A1* | 6/2015 | Satou | B60H 1/3204 165/63 |
| 2015/0204595 | A1* | 7/2015 | Sunderland | F25B 25/005 165/295 |
| 2015/0258875 | A1* | 9/2015 | Enomoto | B60L 1/003 165/104.31 |
| 2015/0273976 | A1 | 10/2015 | Enomoto et al. | |
| 2016/0101666 | A1 | 4/2016 | Sugimura et al. | |
| 2016/0297283 | A1* | 10/2016 | Sakamoto | F25B 47/02 |
| 2016/0297284 | A1* | 10/2016 | Miyakoshi | B60H 1/00392 |

FOREIGN PATENT DOCUMENTS

| | | |
|---|---|---|
| JP | 2014163564 A | 9/2014 |
| JP | 2015007491 A | 1/2015 |
| WO | WO-2011015426 A1 | 2/2011 |
| WO | WO-2013088484 A1 | 6/2013 |

* cited by examiner

REFRIGERATION CYCLE DEVICE

CROSS REFERENCE TO RELATED APPLICATIONS

This application is a U.S. National Phase Application under 35 U.S.C. 371 of International Application No. PCT/JP2016/068316 filed on Jun. 21, 2016 and published in Japanese as WO 2017/010239 A1 on Jan. 19, 2017. This application is based on and claims the benefit of priority from Japanese Patent Applications No. 2015-140358 filed on Jul. 14, 2015, and No. 2016-101482 filed on May 20, 2016. The entire disclosures of all of the above applications are incorporated herein by reference.

Field of the Invention

The present disclosure relates to a refrigeration cycle device that includes a heat medium-refrigerant heat exchanger to exchange heat between a heat medium and a refrigerant.

Background Art

Conventionally, Patent Document 1 describes a refrigeration cycle device that heats a heating target device using hot heat of a coolant, heated by a high-pressure side heat exchanger in a refrigeration cycle, and cools a cooling target device using cold heat of a coolant, cooled by a low-pressure side heat exchanger in the refrigeration cycle.

Such a refrigeration cycle device in the related art includes a radiator that dissipates heat from the coolant into air by exchanging heat between the coolant heated by the high-pressure side heat exchanger and the air.

In the related art, a switching valve is operated to switch the flow of the coolant to thereby heat or cool a temperature-adjustment target device. Specifically, the switching valve switches between a state in which the coolant heated by the high-pressure side heat exchanger in the refrigeration cycle flows through the temperature-adjustment target device and a state in which the coolant cooled by the low-pressure side heat exchanger in the refrigeration cycle flows through the temperature-adjustment target device.

RELATED ART DOCUMENT

Patent Document

[Patent Document 1] Japanese Unexamined Patent Application Publication No.

SUMMARY OF INVENTION

According to studies by the inventors of the present disclosure, in the related art mentioned above, the high-pressure side refrigerant in the refrigeration cycle exchanges heat with air via the coolant, and thereby the refrigeration cycle efficiency would become deteriorated, compared to a refrigeration cycle device in which the high-pressure side refrigerant in the refrigeration cycle directly exchanges heat with air without involvement of any coolant.

For example, in an air-refrigerant heat exchanger where the high-pressure refrigerant in the refrigeration cycle directly exchanges heat with the air, the refrigerant is mainly in a gas-liquid two-phase state. Thus, the temperature efficiency of the air with respect to the refrigerant is in a range of approximately 75 to 85%. Meanwhile, in the radiator of the related art, the temperature efficiency is only in a range of approximately 50 to 60% because the coolant is in a liquid-phase state.

In view of the foregoing matter, it is an object of the present disclosure to improve the refrigeration cycle efficiency of a refrigeration cycle device that includes a heat medium-refrigerant heat exchanger to exchange heat between a refrigerant and a heat medium.

In a refrigeration cycle device where the high-pressure side refrigerant in the refrigeration cycle exchanges heat with the coolant while the low-pressure side refrigerant in the refrigeration cycle exchanges heat with the air, once the temperature of the low-pressure side refrigerant falls below the freezing point, frost is occasionally generated in the heat exchanger that exchanges heat between the low-pressure side refrigerant and the air.

In view of the foregoing matter, it is another object of the present disclosure to enable defrosting of an air-refrigerant heat exchanger that exchanges heat between a low-pressure side refrigerant and air in a refrigeration cycle device. The refrigeration cycle device includes the air-refrigerant heat exchanger and a heat medium-refrigerant heat exchanger that exchanges heat between a high-pressure side refrigerant and a heat medium.

In the related art, the flow of the coolant (in other words, heat medium) is switched by the switching valve to heat or cool the temperature-adjustment target device. Consequently, a coolant circuit becomes complicated. Furthermore, the switching valve is required to have high thermal insulation properties and low leakage because the high-temperature coolant and the low-temperature coolant flow through the switching valve.

In view of the foregoing matter, it is a further object of the present disclosure to enable the adjustment of the temperature of a temperature-adjustment target device without switching the flow of a heat medium.

A refrigeration cycle device according to a first aspect of the present disclosure includes:

a compressor that draws and discharges a refrigerant;

an air-refrigerant heat exchanger that exchanges heat between air and the refrigerant;

a decompression device that decompresses the refrigerant;

a heat medium-refrigerant heat exchanger that exchanges heat between a heat medium and the refrigerant;

a cold-heat utilization device that utilizes cold heat of the heat medium;

a hot-heat utilization device that utilizes hot heat of the heat medium;

a refrigerant flow switching device that switches between a heat-medium cooling mode and a heat-medium heating mode, the heat-medium cooling mode causing the refrigerant to circulate through the compressor, the air-refrigerant heat exchanger, the decompression device, the heat medium-refrigerant heat exchanger, and the compressor in sequence, thereby cooling the heat medium in the heat medium-refrigerant heat exchanger, the heat-medium heating mode causing the refrigerant to circulate through the compressor, the heat medium-refrigerant heat exchanger, the decompression device, the air-refrigerant heat exchanger, and the compressor in sequence, thereby heating the heat medium in the heat medium-refrigerant heat exchanger; and a heat-medium flow switching device that switches a flow of the heat medium such that in the heat-medium cooling mode, the heat medium circulates between the heat medium-refrigerant heat exchanger and the cold-heat utilization device, and that in the heat-medium heating mode, the heat medium circulates between the heat medium-refrigerant heat exchanger and the hot-heat utilization device.

Thus, in the heat-medium cooling mode, the cold heat of the heat medium cooled by the heat medium-refrigerant heat exchanger can be utilized by the cold-heat utilization device, while in the heat-medium heating mode, the hot heat of the heat medium heated by the heat medium-refrigerant heat exchanger can be utilized by the hot-heat utilization device.

In the heat-medium cooling mode, the refrigerant dissipates heat directly into the air in the air-refrigerant heat exchanger, thereby making it possible to improve the refrigeration cycle efficiency, as compared to a case in which the refrigerant dissipates heat into the air via the heat medium.

A refrigeration cycle device according to a second aspect of the present disclosure includes:

a compressor that draws and discharges a refrigerant;

an air-refrigerant heat exchanger that exchanges heat between air and the refrigerant;

a decompression device that decompresses the refrigerant;

a first heat medium-refrigerant heat exchanger and a second heat medium-refrigerant heat exchanger, which are adapted to exchange heat between a heat medium and the refrigerant;

a cold-heat utilization device that utilizes cold heat of the heat medium; and a hot-heat utilization device that utilizes hot heat of the heat medium, wherein the air-refrigerant heat exchanger is adapted to exchange heat between the air and one of the refrigerant provided before being decompressed by the decompression device and the refrigerant provided after being decompressed by the decompression device, the first heat medium-refrigerant heat exchanger is adapted to exchange heat between the heat medium and the other of the refrigerant provided before being decompressed by the decompression device and the refrigerant provided after being decompressed by the decompression device, the second heat medium-refrigerant heat exchanger is adapted to exchange heat between the one refrigerant and the heat medium, the cold-heat utilization device is adapted to cause the heat medium to circulate between the cold-heat utilization device and one of the first heat medium-refrigerant heat exchanger and the second heat medium-refrigerant heat exchanger that exchanges heat between the heat medium and the refrigerant provided after being decompressed by the decompression device, and the hot-heat utilization device is adapted to cause the heat medium to circulate between the hot-heat utilization device and one of the first heat medium-refrigerant heat exchanger and the second heat medium-refrigerant heat exchanger that exchanges heat between the heat medium and the refrigerant provided before being decompressed by the decompression device.

Thus, the cold heat of the heat medium cooled by one of the first and second heat medium-refrigerant heat exchangers can be utilized by the cold-heat utilization device, while the hot heat of the heat medium heated by the other of the first and second heat medium-refrigerant heat exchangers can be utilized by the hot-heat utilization device.

The refrigerant dissipates heat directly into the air in the air-refrigerant heat exchanger, thereby making it possible to improve the refrigeration cycle efficiency, as compared to a case in which the refrigerant dissipates heat into the air via the heat medium.

A refrigeration cycle device according to a third aspect of the present disclosure includes:

a compressor that draws and discharges a refrigerant;

a heat medium-refrigerant heat exchanger that exchanges heat between the refrigerant discharged from the compressor and a heat medium;

a decompression device that decompresses the refrigerant having heat exchanged in the heat medium-refrigerant heat exchanger;

an air-refrigerant heat exchanger that exchanges heat between air and the refrigerant decompressed in the decompression device; and a refrigerant flow switching device adapted to switch a flow of the refrigerant such that the air-refrigerant heat exchanger is positioned on an upstream side of the flow of the refrigerant with respect to the decompression device and that the heat medium-refrigerant heat exchanger is positioned on a downstream side of the flow of the refrigerant with respect to the decompression device when frost adhering to the air-refrigerant heat exchanger needs to be melted.

Thus, the air-refrigerant heat exchanger can absorb heat from air, and thereby the heat medium-refrigerant heat exchanger can heat the heat medium. When frost adhering to the air-refrigerant heat exchanger needs to be melted, the frost that adheres to the air-refrigerant heat exchanger can be melted by using the heat of the refrigerant discharged from the compressor.

A refrigeration cycle device according to a fourth aspect of the present disclosure includes:

a compressor that draws and discharges a refrigerant;

an air-refrigerant heat exchanger that exchanges heat between air and the refrigerant;

a decompression device that decompresses the refrigerant;

a heat medium-refrigerant heat exchanger that exchanges heat between a heat medium and the refrigerant;

a temperature-adjustment target device having a temperature adjusted by the heat medium which has heat exchanged in the heat medium-refrigerant heat exchanger; and a refrigerant flow switching device that switches between a heat-medium cooling mode and a heat-medium heating mode, the heat-medium cooling mode causing the refrigerant to circulate through the compressor, the air-refrigerant heat exchanger, the decompression device, the heat medium-refrigerant heat exchanger, and the compressor in sequence, thereby cooling the heat medium in the heat medium-refrigerant heat exchanger, the heat-medium heating mode causing the refrigerant to circulate through the compressor, the heat medium-refrigerant heat exchanger, the decompression device, the air-refrigerant heat exchanger, and the compressor in sequence, thereby heating the heat medium in the heat medium-refrigerant heat exchanger.

Thus, the refrigerant-flow switching device switches between the heat-medium cooling mode and the heat-medium heating mode, thereby changing the temperature of the heat medium flowing through the temperature-adjustment target device, so that the temperature-adjustment target device can be cooled or heated. Accordingly, the temperature of the temperature-adjustment target device can be adjusted without switching the flow of the heat medium.

DESCRIPTION OF EMBODIMENTS

Figure 1:
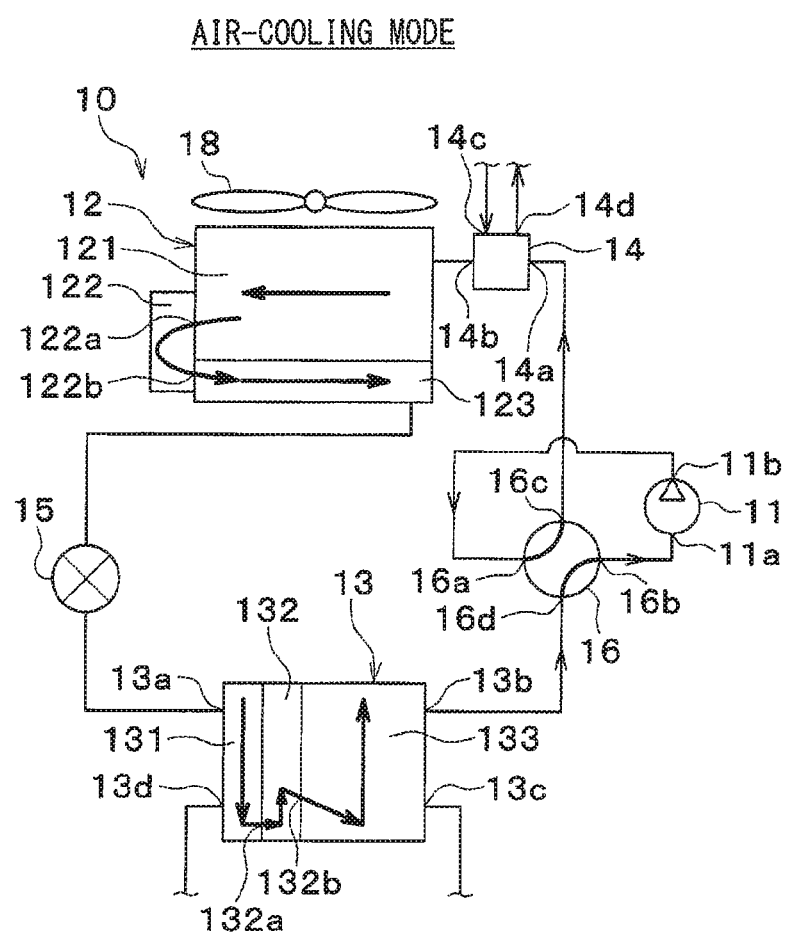
FIG. 1 is an entire configuration diagram of a refrigeration cycle device in a first embodiment, while showing an air-cooling mode.

Embodiments will be described below with reference to the accompanying drawings. In the respective embodiments below, the same or equivalent parts are indicated by the same reference characters throughout the figures.

First Embodiment

A refrigeration cycle device 10 shown in FIG. 1 is used to adjust a vehicle interior space to an appropriate temperature. In this embodiment, the refrigeration cycle device 10 is applied to a hybrid vehicle that obtains a traveling driving force from both an engine (internal combustion engine) and a traveling electric motor.

The hybrid vehicle in this embodiment is configured as a plug-in hybrid vehicle that can charge a battery (vehicle-mounted battery) mounted on the vehicle, with power supplied from an external power source (commercial power source) during stopping of the vehicle. For example, a lithium ion battery can be used as the battery.

The driving force output from the engine is used not only to cause the vehicle to travel, but also to operate a power generator. The power generated by the power generator and the power supplied from the external power source can be stored in the battery. The power stored in the battery is supplied not only to the traveling electric motor, but also to various vehicle-mounted devices, such as electric components included in the refrigeration cycle device 10.

The refrigeration cycle device 10 has a vapor compression refrigerator. The vapor compression refrigerator includes a compressor 11, an air-refrigerant heat exchanger 12, a first coolant-refrigerant heat exchanger 13, a second coolant-refrigerant heat exchanger 14, and an expansion valve 15.

The refrigerant used in the vapor compression refrigerator is a fluorocarbon refrigerant. The vapor compression refrigerator forms a subcritical refrigeration cycle in which a high-pressure side refrigerant pressure does not exceed the critical pressure of the refrigerant.

The compressor 11 is an electric compressor driven by power supplied from the battery or a variable capacity compressor driven by a belt. The compressor 11 draws, compresses, and discharges the refrigerant in the vapor compression refrigerator. The compressor 11 has a refrigerant suction port 11a through which the refrigerant is drawn and a refrigerant discharge port 11b from which the refrigerant is discharged.

The air-refrigerant heat exchanger 12 is a heat exchanger that exchanges heat between the refrigerant and the air. The air-refrigerant heat exchanger 12 is disposed at the forefront of the vehicle. The air-refrigerant heat exchanger 12 receives the outside air blown by an exterior blower 18. During traveling of the vehicle, traveling air can hit the air-refrigerant heat exchanger 12. The exterior blower 18 is a blower that blows the outside air toward the air-refrigerant heat exchanger 12. The exterior blower 18 is an electric blower that includes a fan driven by an electric motor.

The air-refrigerant heat exchanger 12 includes a first air-refrigerant heat exchanging portion 121, a gas-liquid separating portion 122, and a second air-refrigerant heat exchanging portion 123. The first air-refrigerant heat exchanging portion 121 and the second air-refrigerant heat exchanging portion 123 each serve as a heat exchanging core portion that exchanges heat between the refrigerant and air. Each of the first and second air-refrigerant heat exchanging portions 121 and 123 has a refrigerant flow path through which the refrigerant flows and an air flow path through which the air flows.

The gas-liquid separating portion 122 has a gas-liquid separation space that separates the refrigerant into a gas-phase refrigerant and a liquid-phase refrigerant. The gas-liquid separating portion 122 has a first refrigerant circulation port 122a through which the refrigerant circulates to the first air-refrigerant heat exchanging portion 121. The gas-liquid separating portion 122 has a second refrigerant circulation port 122b through which the refrigerant circulates to the second air-refrigerant heat exchanging portion 123. The first refrigerant circulation port 122a is disposed on the upper side in the gravity direction with respect to the second refrigerant circulation port 122b.

The heat exchanging amount of the first air-refrigerant heat exchanging portion 121 is set larger than the heat exchanging amount of the second air-refrigerant heat exchanging portion 123. The flow-path cross-sectional area in the first air-refrigerant heat exchanging portion 121 is set larger than the flow-path cross-sectional area in the second air-refrigerant heat exchanging portion 123.

The first air-refrigerant heat exchanging portion 121 is connected to the second coolant-refrigerant heat exchanger 14. In this way, the air-refrigerant heat exchanger 12 and the second coolant-refrigerant heat exchanger 14 are disposed in series with respect to the refrigerant flow. The second air-refrigerant heat exchanging portion 123 is connected to the expansion valve 15.

Each of the first coolant-refrigerant heat exchanger 13 and the second coolant-refrigerant heat exchanger 14 is a heat exchanger that exchanges heat between the refrigerant and the coolant. The coolant is a fluid as the heat medium. In this embodiment, the coolant suitable for use is a liquid containing at least ethylene glycol, dimethylpolysiloxane or a nanofluid, or an antifreezing fluid.

The first coolant-refrigerant heat exchanger 13 is a first heat medium-refrigerant heat exchanger that exchanges heat between the heat medium and the refrigerant. The second coolant-refrigerant heat exchanger 14 is a second heat medium-refrigerant heat exchanger that exchanges heat between the heat medium and the refrigerant.

The heat exchanging capacity of the first coolant-refrigerant heat exchanger 13 is set larger than the heat exchanging capacity of the second coolant-refrigerant heat exchanger 14.

Figure 2:
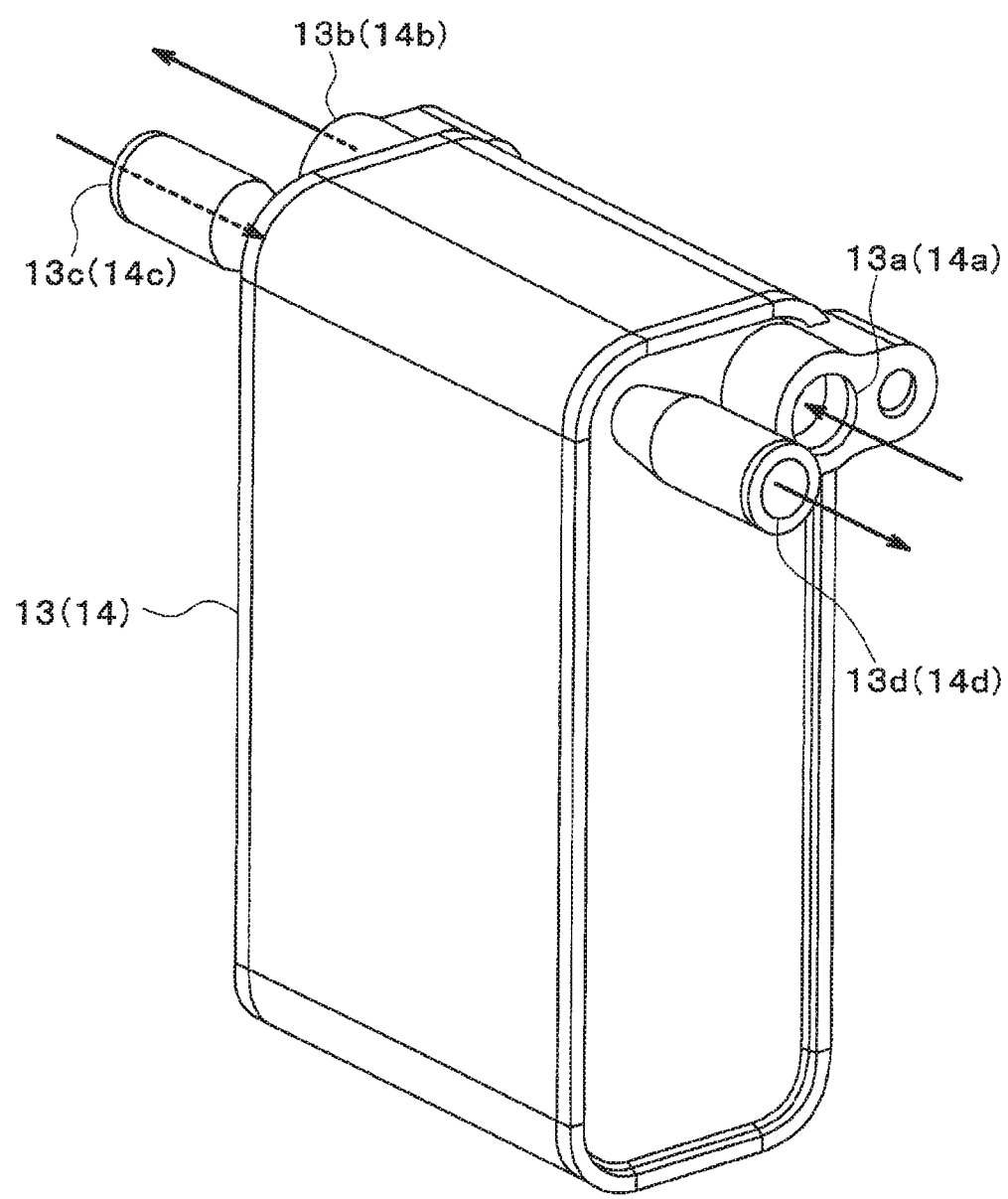
FIG. 2 is a perspective view showing a first coolant-refrigerant heat exchanger in the first embodiment.

As shown in FIGS. 1 and 2, the first coolant-refrigerant heat exchanger 13 is provided with a first refrigerant inlet/outlet 13a, a second refrigerant inlet/outlet 13b, a first coolant inlet/outlet 13c, and a second coolant inlet/outlet 13d.

The second coolant-refrigerant heat exchanger 14 has substantially the same basic structure as the first coolant-refrigerant heat exchanger 13. Thus, a reference character corresponding to a component of the second coolant-refrigerant heat exchanger 14 is given in a parenthesis shown in FIG. 2, and the illustration of the second coolant-refrigerant heat exchanger 14 is omitted.

That is, the second coolant-refrigerant heat exchanger 14 is provided with a first refrigerant inlet 14a, a second refrigerant outlet 14b, a first coolant inlet 14c, and a second coolant outlet 14d.

The size of the second coolant-refrigerant heat exchanger 14 is set smaller than the size of the first coolant-refrigerant heat exchanger 13.

As shown in FIG. 1, the first coolant-refrigerant heat exchanger 13 includes a first coolant-refrigerant heat exchanging portion 131, a gas-liquid separating portion 132, and a second coolant-refrigerant heat exchanging portion 133. The first coolant-refrigerant heat exchanging portion 131 and the second coolant-refrigerant heat exchanging portion 133 each serve as a heat exchanging core portion that exchanges heat between the coolant and the refrigerant. Each of the first and second coolant-refrigerant heat exchanging portions 131 and 133 has a refrigerant flow path through which the refrigerant flows and a coolant flow path through which the coolant flows.

The first coolant-refrigerant heat exchanging portion 131 is a first heat medium-refrigerant heat exchanging portion that exchanges heat between the heat medium and the refrigerant. The second coolant-refrigerant heat exchanging portion 133 is a second heat medium-refrigerant heat exchanging portion that exchanges heat between the heat medium and the refrigerant.

The gas-liquid separating portion 132 has a gas-liquid separation space that separates the refrigerant into a gas-phase refrigerant and a liquid-phase refrigerant. The gas-liquid separating portion 132 has a first refrigerant circulation port 132a through which the refrigerant circulates to the first coolant-refrigerant heat exchanging portion 131. The gas-liquid separating portion 132 has a second refrigerant circulation port 132b through which the refrigerant circulates to the second coolant-refrigerant heat exchanging portion 133. The first refrigerant circulation port 132a is disposed on the lower side in the gravity direction with respect to the second refrigerant circulation port 132b.

The heat exchanging amount of the second coolant-refrigerant heat exchanging portion 133 is set larger than the heat exchanging amount of the first coolant-refrigerant heat exchanging portion 131. The flow-path cross-sectional area in the second coolant-refrigerant heat exchanging portion 133 is set larger than the flow-path cross-sectional area in the first coolant-refrigerant heat exchanging portion 131. The first coolant-refrigerant heat exchanging portion 131 is connected to the expansion valve 15.

The expansion valve 15 is a decompression device that decompresses and expands a liquid-phase refrigerant. The first coolant-refrigerant heat exchanger 13 is a heat exchanger that exchanges heat between the refrigerant and the coolant. The expansion valve 15 is a bidirectional expansion valve capable of decompressing and expanding the refrigerant even when the refrigerant flows back.

A refrigerant flow switching valve 16 is a refrigerant-flow switching device that switches the state of the refrigerant flow in accordance with an air-conditioning mode. The refrigerant flow switching valve 16 includes: a refrigerant inflow port 16a from which the refrigerant flows into the refrigerant flow switching valve 16; a refrigerant outflow port 16b through which the refrigerant flows out of the refrigerant flow switching valve 16; and a first inflow/outflow port 16c and a second inflow/outflow port 16d through which the refrigerant flows into or out of the refrigerant flow switching valve 16.

The refrigerant inflow port 16a is connected to a refrigerant discharge side of the compressor 11. The refrigerant outflow port 16b is connected to a refrigerant suction side of the compressor 11. The first inflow/outflow port 16c is connected to the second coolant-refrigerant heat exchanger 14. The second inflow/outflow port 16d is connected to the second coolant-refrigerant heat exchanging portion 133 of the first coolant-refrigerant heat exchanger 13.

Figure 3:
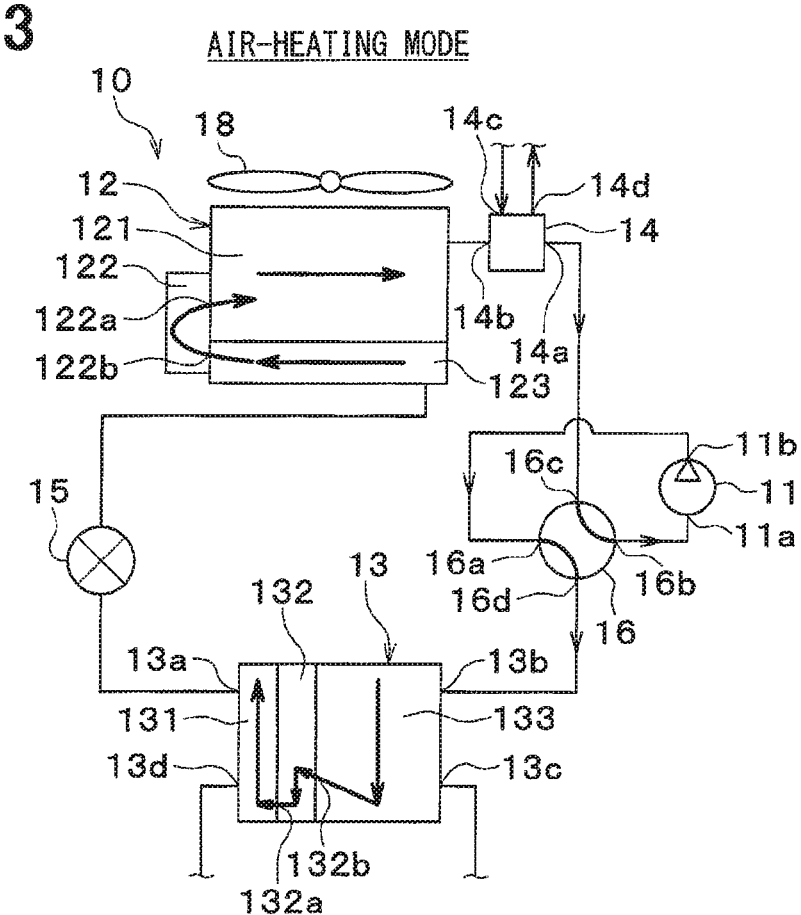
FIG. 3 is an entire configuration diagram of the refrigeration cycle device in the first embodiment, while showing an air-heating mode.

The refrigerant flow switching valve 16 switches between a state, shown in FIG. 1, in which the refrigerant inflow port 16a is connected to the first inflow/outflow port 16c and the refrigerant outflow port 16b is connected to the second inflow/outflow port 16d and a state, shown in FIG. 3, in which the refrigerant inflow port 16a is connected to the second inflow/outflow port 16d and the refrigerant outflow port 16b is connected to the first inflow/outflow port 16c.

When the air-conditioning mode is an air-cooling mode, the refrigerant flow switching valve 16 switches the refrigerant flow to the state shown in FIG. 1. In other words, when the air-conditioning mode is the air-cooling mode, the refrigerant flow switching valve 16 connects between the refrigerant discharge port of the compressor 11 and the second coolant-refrigerant heat exchanger 14, and also connects between the refrigerant suction port of the compressor 11 and the first coolant-refrigerant heat exchanger 13.

When the air-conditioning mode is an air-heating mode, the refrigerant flow switching valve 16 switches the refrigerant flow to the state shown in FIG. 2. In other words, when the air-conditioning mode is the air-heating mode, the refrigerant flow switching valve 16 connects between the refrigerant discharge port of the compressor 11 and the first coolant-refrigerant heat exchanger 13, and also connects between the refrigerant suction port of the compressor 11 and the second coolant-refrigerant heat exchanger 14.

Figure 4:
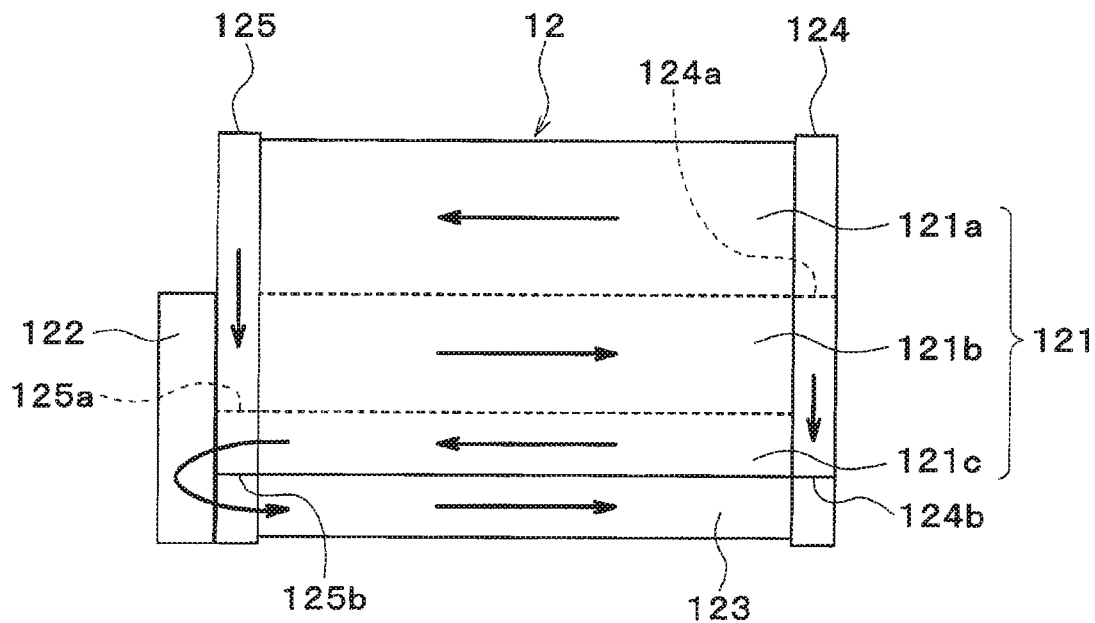
FIG. 4 is a schematic diagram showing the flow of a refrigerant in the air-cooling mode of an air-refrigerant heat exchanger in the first embodiment.

As shown in FIG. 4, the air-refrigerant heat exchanger 12 includes a first tank 124 and a second tank 125. The first tank 124 and the second tank 125 distribute and collect the refrigerant with respect to numerous tubes 126 in the air-refrigerant heat exchanger 12.

Figure 5:
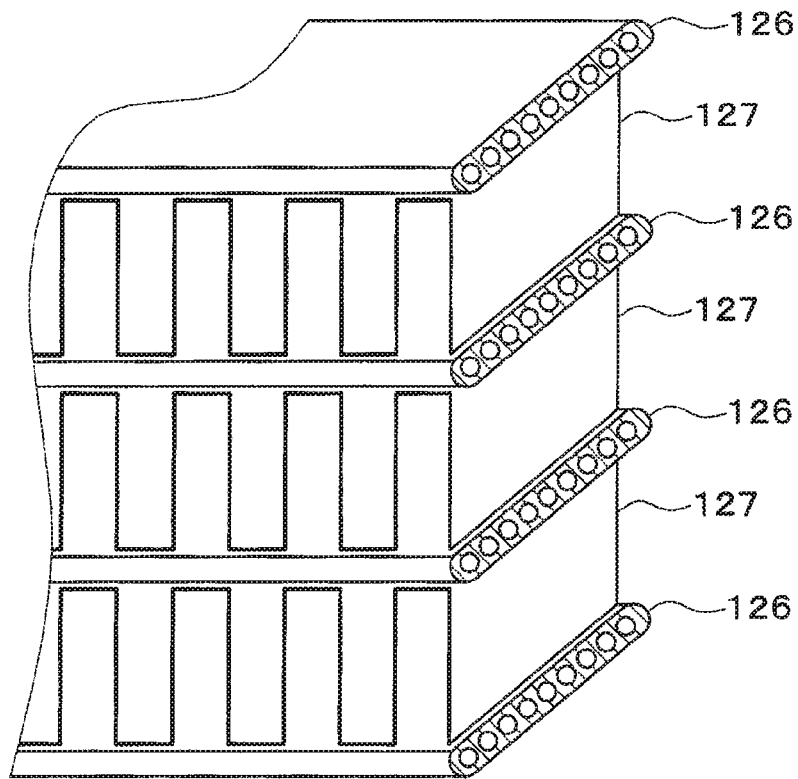
FIG. 5 is a perspective view showing a part of the air-refrigerant heat exchanger in the first embodiment.

As shown in FIG. 5, the numerous tubes 126 are formed to have the flat cross sections and to allow the refrigerant to flow therethrough. The cross-sectional areas of the numerous tubes 126 are the same with each other. The numerous tubes 126 and fins 127 are alternately stacked on top of each other. Each fin 127 is formed in a wave shape and promotes the heat exchange between the refrigerant and the air.

As shown in FIG. 4, partition portions 124a and 124b are provided in the first tank 124, while partition portions 125a and 125b are provided in the second tank 125.

The partition portions 124a, 124b, 125a, and 125b form a first path 121a, a second path 121b, a third path 121c, and a fourth path 123 in the air-refrigerant heat exchanger 12, respectively.

The number N1 of tubes in the first path 121a, the number N2 of tubes in the second path 121b, the number N3 of tubes in the third path 121c, and the number N4 of tubes in the fourth path 123 satisfy the relationship of N1>N2>N3>N4.

The first path 121a, the second path 121b, and the third path 121c configure the first air-refrigerant heat exchanging portion 121 of the air-refrigerant heat exchanger 12. The fourth path 123 configures the second air-refrigerant heat exchanging portion 123 of the air-refrigerant heat exchanger 12.

Figure 6:
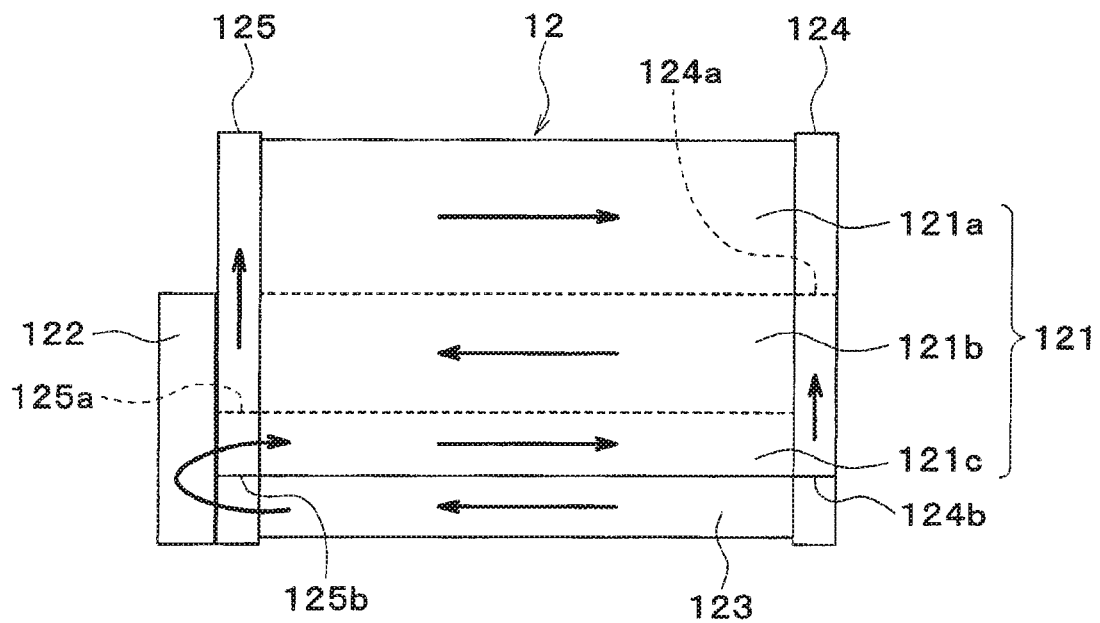
FIG. 6 is a schematic diagram showing the flow of a refrigerant in the air-heating mode of the air-refrigerant heat exchanger in the first embodiment.

The arrow in FIG. 4 indicates the direction of the refrigerant flow in the air-cooling mode of the air-refrigerant heat exchanger 12. The arrow in FIG. 6 indicates the direction of the refrigerant flow in the air-heating mode of the air-refrigerant heat exchanger 12.

The partition portions 124a, 124b, 125a, and 125b are provided such that in the air-cooling mode, the refrigerant flows through the first path 121a, the second path 121b, the third path 121c, and the fourth path 123 in this order, whereas in the air-heating mode, the refrigerant flows through the fourth path 123, the third path 121c, the second path 121b, and the first path 121a in this order.

Therefore, in the air-cooling mode, the air-refrigerant heat exchanger 12 has its flow-path cross-sectional area for the refrigerant decreased from the upstream side to downstream side in the direction of the refrigerant flow. Meanwhile, in the air-heating mode, the air-refrigerant heat exchanger 12 has its flow-path cross-sectional area for the refrigerant increased from the upstream side to downstream side of the refrigerant flow.

The flow-path cross-sectional area is obtained by a product of the number of tubes 126 per path and the cross-sectional area of each tube 126. That is, the flow-path cross-sectional area of the first path 121a is obtained by a product of the number N1 of the tubes in the first path 121a and the cross-sectional area of each tube 126. The flow-path cross-sectional area of the second path 121b is obtained by a product of the number N2 of the tubes in the second path 121b and the cross-sectional area of each tube 126. The flow-path cross-sectional area of the third path 121c is obtained by a product of the number N3 of the tubes in the third path 121c and the cross-sectional area of each tube 126. The flow-path cross-sectional area of the fourth path 123 is obtained by a product of the number N4 of the tubes in the fourth path 123 and the cross-sectional area of each tube 126.

The first coolant-refrigerant heat exchanger 13 also has a plurality of paths formed therein, like the air-refrigerant heat exchanger 12. Therefore, like the air-refrigerant heat exchanger 12, the first coolant-refrigerant heat exchanger 13 has its flow-path cross-sectional area for the refrigerant decreased from the upstream side to downstream side in the direction of the refrigerant flow. Further, in the air-heating mode, the first coolant-refrigerant heat exchanger 13 has its flow-path cross-sectional area for the refrigerant increased from the upstream side to downstream side in the direction of the refrigerant flow, like the air-refrigerant heat exchanger 12.

Figure 7:
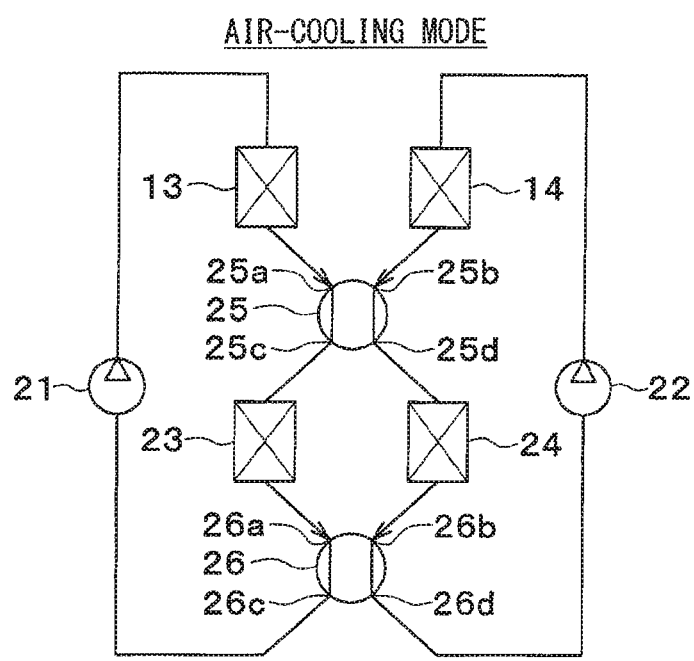
FIG. 7 is a configuration diagram showing a coolant circuit of the refrigeration cycle device in the first embodiment, while showing the air-cooling mode.
Figure 8:
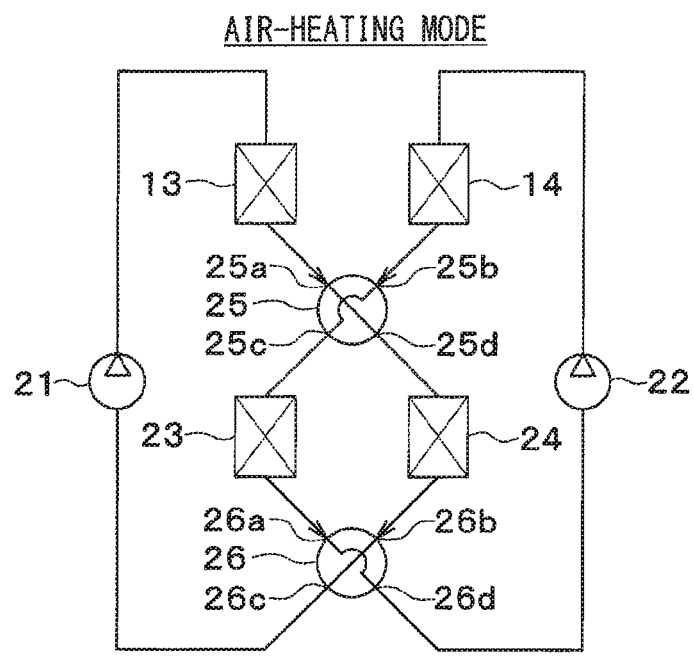
FIG. 8 is a configuration diagram showing a coolant circuit of the refrigeration cycle device in the first embodiment, while showing the air-heating mode.

As shown in FIGS. 7 and 8, the refrigeration cycle device 10 includes a first coolant pump 21, a second coolant pump 22, a cooler core 23, a heater core 24, an upstream-side coolant flow switching valve 25, and a downstream-side coolant flow switching valve 26.

The first coolant pump 21 is an electric pump that draws and discharges the coolant circulating through the first coolant-refrigerant heat exchanger 13. The first coolant pump 21 is a first electric heat-medium pump that draws and discharges the heat medium. A coolant discharge side of the first coolant pump 21 is connected to a coolant inlet side of the first coolant-refrigerant heat exchanger 13.

The second coolant pump 22 is an electric pump that draws and discharges the coolant (heat medium) circulating through the second coolant-refrigerant heat exchanger 14. The second coolant pump 22 is a second electric heat-medium pump that draws and discharges the heat medium. A coolant discharge side of the second coolant pump 22 is connected to a coolant inlet side of the second coolant-refrigerant heat exchanger 14.

The cooler core 23 and the heater core 24 are coolant-circulation devices (heat-medium circulation devices) through which the coolant circulates.

The cooler core 23 is an air cooling heat exchanger (heat medium-air heat exchanger) that cools ventilation air into the vehicle interior space by exchanging heat between the coolant and the ventilation air into the vehicle interior space. The cooler core 23 is a cold-heat utilization device that utilizes cold heat of the coolant.

In the cooler core 23, the coolant absorbs heat from the ventilation air via sensible heat change. That is, in the cooler core 23, the coolant does not experience phase change and remains in the liquid phase, even though the coolant absorbs heat from the ventilation air.

The heater core 24 is an air heating heat exchanger (heat medium-air heat exchanger) that heats ventilation air into the vehicle interior space by exchanging heat between the coolant and the ventilation air into the vehicle interior space. The heater core 24 is a hot-heat utilization device that utilizes hot heat of the coolant.

In the heater core 24, the coolant dissipates heat into the ventilation air via sensible heat change. That is, in the heater core 24, the coolant does not experience phase change and remains in the liquid phase, even though the coolant dissipates heat into the ventilation air.

The upstream-side coolant flow switching valve 25 and the downstream-side coolant flow switching valve 26 are coolant flow switching devices that switch the state of the coolant flow in accordance with the air-conditioning mode.

The upstream-side coolant flow switching valve 25 includes a first coolant inflow port 25a and a second coolant inflow port 25b, from both of which the coolant flows into the upstream-side coolant flow switching valve 25, and a first coolant outflow port 25c and a second coolant outflow port 25d, through both of which the coolant flows out of the upstream-side coolant flow switching valve 25.

The first coolant inflow port 25a is connected to a coolant outlet side of the first coolant-refrigerant heat exchanger 13. The second coolant inflow port 25b is connected to a coolant outlet side of the second coolant-refrigerant heat exchanger 14.

The first coolant outflow port 25c is connected to a coolant inlet side of the cooler core 23. The second coolant outflow port 25d is connected to a coolant inlet side of the heater core 24.

The upstream-side coolant flow switching valve 25 switches between a state in which the first coolant inflow port 25a is connected to the first coolant outflow port 25c, and the second coolant inflow port 25b is connected to the second coolant outflow port 25d, and a state in which the first coolant inflow port 25a is connected to the second coolant outflow port 25d, and the second coolant inflow port 25b is connected to the first coolant outflow port 25c.

The downstream-side coolant flow switching valve 26 includes a first coolant inflow port 26a and a second coolant inflow port 26b, from both of which the coolant flows into the downstream-side coolant flow switching valve 26, and a first coolant outflow port 26c and a second coolant outflow port 26d, through both of which the coolant flows out of the downstream-side coolant flow switching valve 26.

The first coolant inflow port 26a is connected to a coolant outlet side of the cooler core 23. The second coolant inflow port 26b is connected to a coolant outlet side of the heater core 24.

The first coolant outflow port 26c is connected to a coolant suction side of the first coolant pump 21. The second coolant outflow port 26d is connected to a coolant suction side of the second coolant pump 22.

The downstream-side coolant flow switching valve 26 switches between a state in which the first coolant inflow port 26a is connected to the first coolant outflow port 26c, and the second coolant inflow port 26b is connected to the second coolant outflow port 26d, and a state in which the first coolant inflow port 26a is connected to the second coolant outflow port 26d, and the second coolant inflow port 26b is connected to the first coolant outflow port 26c.

As shown in FIG. 7, when the air-conditioning mode is the air-cooling mode, the upstream-side coolant flow switching valve 25 connects between the first coolant inflow port 25a and the first coolant outflow port 25c, and connects between the second coolant inflow port 25b and the second coolant outflow port 25d. Further, when the air-conditioning mode is the air-cooling mode, the downstream-side coolant flow switching valve 26 connects between the first coolant inflow port 26a and the first coolant outflow port 26c, and connects between the second coolant inflow port 26b and the second coolant outflow port 26d.

In other words, when the air-conditioning mode is the air-cooling mode, the upstream-side coolant flow switching valve 25 and the downstream-side coolant flow switching valve 26 connect between the first coolant-refrigerant heat exchanger 13 and the cooler core 23, and also connect between the second coolant-refrigerant heat exchanger 14 and the heater core 24.

As shown in FIG. 8, when the air-conditioning mode is the air-heating mode, the upstream-side coolant flow switching valve 25 connects between the first coolant inflow port 25a and the second coolant outflow port 25d, and connects between the second coolant inflow port 25b and the first coolant outflow port 25c. Further, when the air-conditioning mode is the air-heating mode, the downstream-side coolant flow switching valve 26 connects between the first coolant inflow port 26a and the second coolant outflow port 26d, and connects between the second coolant inflow port 26b and the first coolant outflow port 26c.

In other words, when the air-conditioning mode is the air-heating mode, the downstream-side coolant flow switching valve 26 connects between the first coolant-refrigerant heat exchanger 13 and the heater core 24, and connects between the second coolant-refrigerant heat exchanger 14 and the cooler core 23.

Figure 9:
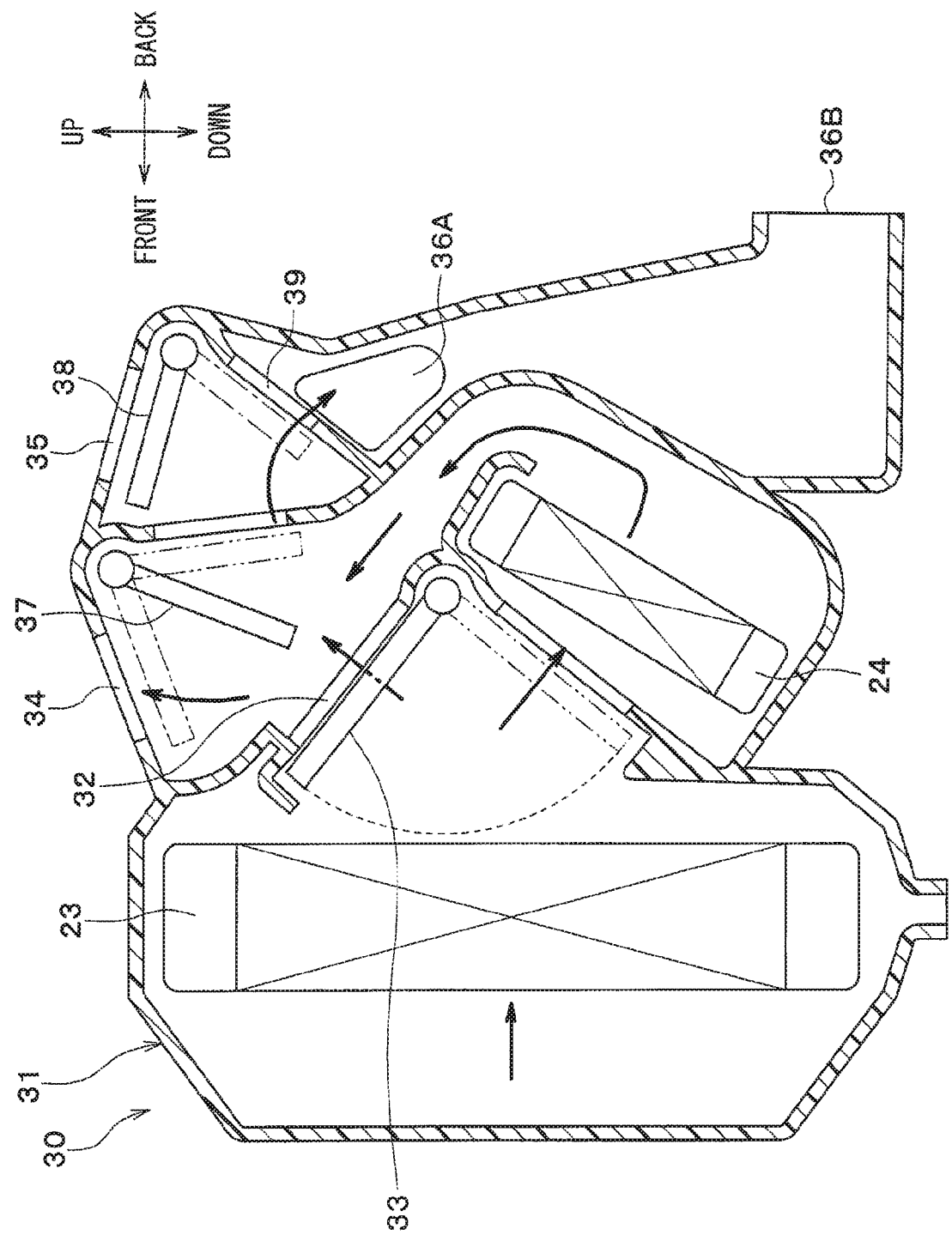
FIG. 9 is a cross-sectional view showing an interior air-conditioning unit in the first embodiment.

As shown in FIG. 9, the cooler core 23 and the heater core 24 are accommodated in a casing 31 of an interior air-conditioning unit 30 in the vehicle air conditioner. The casing 31 has an air passage formed therein to allow the air to flow therethrough.

An inside/outside air switching box (not shown) and an interior blower (not shown) are disposed in positions on the most upstream side of the air flow within the casing 31. The inside/outside air switching box is an inside/outside air switching device that switches between the outside air and the inside air to introduce the switched air into the casing. The outside air is air outside a vehicle compartment. The inside air is air inside the vehicle compartment.

The interior blower is a blower that draws and blows out the air. The cooler core 23 and the heater core 24 are disposed on the downstream side of the air flow with respect to the interior blower within the casing 31. The heater core 24 is disposed on the downstream side of the air flow with respect to the cooler core 23.

A cold-air bypass passage 32 is formed at the downstream side of the air flow with respect to the cooler core 23 within the casing 31. The cold-air bypass passage 32 is a passage through which cold air having passed through the cooler core 23 flows bypassing the heater core 24.

An air mix door 33, which serves as a temperature adjuster, is disposed between the cooler core 23 and the heater core 24. The air mix door 33 regulates respective opening degrees of the cold-air bypass passage 32 and a ventilation passage on a side of the heater core 24, thereby adjusting the ratio of the volume of the cold air flowing into the heater core 24 to that of the cold air passing through the cold-air bypass passage 32.

The air mix door 33 is a rotary door that includes a rotary shaft rotatably supported relative to the casing 31 and a door board coupled to the rotary shaft.

The hot air having passed through the heater core 24 and the cold air having passed through the cold-air bypass passage 32 are mixed together within the casing 31, thereby adjusting the temperature of the conditioned air to be blown into the vehicle interior space. Therefore, by regulating the opening-degree position of the air mix door 33, the temperature of the conditioned air can be adjusted to the desired temperature.

A defroster opening 34, a face opening 35, a foot opening 36A, and a rear foot opening 36B are formed in positions at the most downstream side of the air flow within the casing 31.

The defroster opening 34 is connected to a defroster air outlet (not shown) disposed in the vehicle interior space via a defroster duct (not shown), so that the conditioned air is blown out of the defroster air outlet toward an inner surface of the vehicle window glass.

The face opening 35 is connected to a face air outlet (not shown) disposed in the vehicle interior space via a face duct (not shown), so that the conditioned air is blown out of the face air outlet toward the upper body of an occupant.

The foot opening 36A is connected to a foot duct (not shown) extending downward, so that the conditioned air is blown out of a foot air outlet at a tip end of the foot duct toward the feet of an occupant sitting on a front seat.

The rear foot opening 36B is connected to a rear foot duct (not shown) extending to the rear side of the vehicle, so that the conditioned air is blown out of a rear foot air outlet at a tip end of the rear foot duct toward the feet of an occupant sitting on a rear seat.

The defroster opening 34 is opened and closed by a defroster door 37. The face opening 35, the foot opening 36A, and the rear foot opening 36B are opened and closed by a face and foot door 38.

The face and foot door 38 opens and closes a foot passage inlet 39, thereby opening and closing the foot opening 36A and the rear foot opening 36B. The foot passage inlet 39 is an inlet of an air passage that leads from the vicinity of the face opening 35 to the foot opening 36A and the rear foot opening 36B.

Each of a defroster door 37 and the face and foot door 38 is a rotary door that includes a rotary shaft rotatably supported relative to the casing 31 and a door board coupled to the rotary shaft.

Figure 10:
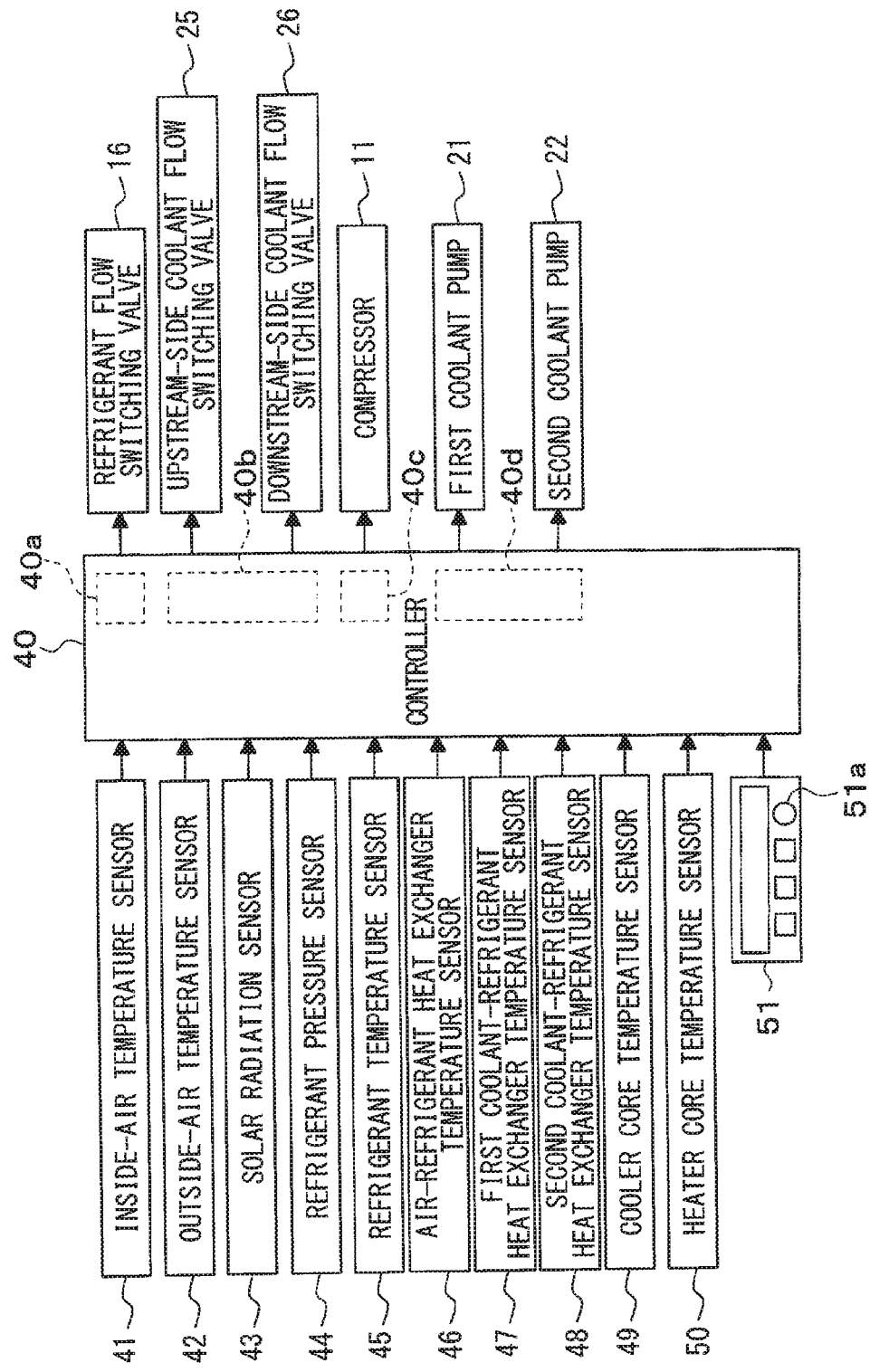
FIG. 10 is a block diagram showing an electric control unit of the refrigeration cycle device in the first embodiment.

A controller 40 shown in FIG. 10 controls the operations of the refrigerant flow switching valve 16, the upstream-side coolant flow switching valve 25, and the downstream-side coolant flow switching valve 26.

The controller 40 is configured of a well-known microcomputer, including a CPU, an ROM, and an RAM, and a peripheral circuit thereof. The controller performs various computations and processing based on air-conditioning control programs stored in the ROM to thereby control the operations of various control target devices that are connected to its output side.

The controller 40 also controls the operations of the compressor 11, the first coolant pump 21, the second coolant pump 22, the interior blower of the interior air-conditioning unit 30, and the like.

In the controller 40, hardware and software that control the operations of various control target devices, connected to the output side of the controller 40, configure control units for controlling the respective operations of the control target devices.

In the controller 40, hardware and software that control the operation of the refrigerant flow switching valve 16 configure a refrigerant-flow control unit 40a. The refrigerant-flow control unit 40a also serves as a refrigerant circulation switching control unit that switches the circulation state of the coolant.

In the controller 40, hardware and software that control the operations of the upstream-side coolant flow switching valve 25 and the downstream-side coolant flow switching valve 26 configure a coolant-flow control unit 40b. The coolant-flow control unit 40b also serves as a coolant circulation switching control unit that switches the circulation state of the coolant.

In the controller 40, hardware and software that control the operation of the compressor 11 configure a compressor control unit 40c. The compressor control unit 40c serves as a refrigerant flow-rate control unit that controls the flow rate of the refrigerant discharged from the compressor 11.

In the controller 40, hardware and software that control the operations of the first coolant pump 21 and the second coolant pump 22 configure a pump control unit 40d. The pump control unit 40d serves as a coolant flow-rate control unit that controls the flow rate of the coolant flowing through each coolant-circulation device. The pump control unit 40d serves as a heat-medium flow-rate control unit that controls the flow rate of the heat medium.

The respective control units 40a, 40b, 40c, and 40d may be configured separately from the controller 40.

Detection signals from a group of sensors are input to the input side of the controller 40. The sensor group includes an inside-air temperature sensor 41, an outside-air temperature sensor 42, a solar radiation sensor 43, a refrigerant pressure sensor 44, a refrigerant temperature sensor 45, an air-refrigerant heat exchanger temperature sensor 46, a first coolant-refrigerant heat exchanger temperature sensor 47, a second coolant-refrigerant heat exchanger temperature sensor 48, a cooler core temperature sensor 49, and a heater core temperature sensor 50.

The inside-air temperature sensor 41 is an inside-air temperature detector that detects the temperature of the inside air. The outside-air temperature sensor 42 is an outside-air temperature detector that detects the temperature of the outside air. The solar radiation sensor 43 is a solar radiation amount detector that detects the amount of solar radiation received by the vehicle interior.

The refrigerant pressure sensor 44 is a refrigerant pressure detector that detects the pressure of the refrigerant. The refrigerant temperature sensor 45 is a refrigerant temperature detector that detects the temperature of the refrigerant. The air-refrigerant heat exchanger temperature sensor 46 is a heat exchanger temperature detector that detects the temperature of the air-refrigerant heat exchanger 12.

The first coolant-refrigerant heat exchanger temperature sensor 47 is a heat exchanger temperature detector that detects the temperature of the first coolant-refrigerant heat exchanger 13. The second coolant-refrigerant heat exchanger temperature sensor 48 is a heat exchanger temperature detector that detects the temperature of the second coolant-refrigerant heat exchanger 14.

The cooler core temperature sensor 49 is a heat exchanger temperature detector that detects the temperature of the cooler core 23. For example, the cooler core temperature sensor 49 is a fin thermistor that detects the temperature of a heat exchange fin in the cooler core 23. The cooler core temperature sensor 49 is a water-temperature sensor that detects the temperature of the coolant flowing through the cooler core 23.

The heater core temperature sensor 50 is a heat exchanger temperature detector that detects the temperature of the heater core 24. Further, the heater core temperature sensor 50 is a water-temperature sensor that detects the temperature of the coolant flowing through the heater core 24. The heater-core temperature sensor 50 is a fin thermistor that detects the temperature of a heat exchange fin in the heater core 24.

An operation panel 51 is provided with various air-conditioning operation switches. Operation signals from these operation switches are input to the input side of the controller 40. For example, the operation panel 51 is disposed near the dashboard at the front of the vehicle interior.

Various types of air-conditioning operation switches provided on the operation panel 51 include a vehicle-interior temperature setting switch 51a, an automatic switch, an air-conditioner switch, an air-volume setting switch, and an air-conditioning stop switch.

Each switch may be of a push switch type that brings electric contacts into conduction by being mechanically pushed, or a touch screen type that reacts in response to contact with a predetermined region on an electrostatic panel.

The vehicle-interior temperature setting switch 51a is a target temperature setting portion that sets a target vehicle-interior temperature by the occupant's operation. The automatic switch is a switch that sets and cancels automatic control of the air conditioning. The air-conditioner switch is a switch that switches between operating and stopping (turning on and off) of air-cooling or dehumidification. The air-volume setting switch is a switch that sets the volume of air blown from the interior blower. The air-conditioning stop switch is a switch that stops the air conditioning.

The controller 40 determines an air-conditioning mode based on an outside air temperature and a target air outlet temperature TAO of the air to be blown into the vehicle interior. The target air outlet temperature TAO is a value determined so that an inside air temperature Tr quickly approaches a target temperature Tset desired by the occupant, and calculated by the following formula F1.

$$TAO = Kset \times Tset - Kr \times Tr - Kam \times Tam - Ks \times Ts + C \qquad F1$$

In this formula, Tset is a target vehicle interior temperature set by the vehicle-interior temperature setting switch 51a, Tr is an inside air temperature detected by the inside-air temperature sensor 41, Tam is an outside air temperature detected by the outside-air temperature sensor 42, and Ts is a solar radiation amount detected by the solar radiation sensor 43. Kset, Kr, Kam, and Ks are control gains, and C is a constant for correction.

For example, the controller 40 determines the air-conditioning mode to be an air-cooling mode when the target air outlet temperature TAO is lower than the outside air temperature, whereas the controller 40 determines the air-conditioning mode to be an air-heating mode when the target air outlet temperature TAO is higher than the outside air temperature.

Next, the operation of the above-mentioned structure will be described. When the air-conditioning mode is the air-cooling mode, the controller 40 switches the refrigerant flow switching valve 16 and the coolant flow switching valves 25 and 26 to an operation in the air-cooling mode shown in FIGS. 1 and 7. Thus, the refrigerant circulates through the compressor 11, the second coolant-refrigerant heat exchanger 14, the air-refrigerant heat exchanger 12, the expansion valve 15, the first coolant-refrigerant heat exchanger 13, and the compressor 11 in this order. The coolant circulates between the first coolant-refrigerant heat exchanger 13 and the cooler core 23, and the coolant circulates between the second coolant-refrigerant heat exchanger 14 and the heater core 24.

In the air-cooling mode, the second coolant-refrigerant heat exchanger 14 and the air-refrigerant heat exchanger 12 function as the high-pressure side heat exchangers in the refrigeration cycle, while the first coolant-refrigerant heat exchanger 13 functions as the low-pressure side heat exchanger in the refrigeration cycle. That is, the high-pressure side refrigerant in the refrigeration cycle dissipates heat in the second coolant-refrigerant heat exchanger 14 and the air-refrigerant heat exchanger 12, while the low-pressure side refrigerant in the refrigeration cycle absorbs heat in the first coolant-refrigerant heat exchanger 13.

Accordingly, the coolant is heated in the second coolant-refrigerant heat exchanger 14, while the coolant is cooled in the first coolant-refrigerant heat exchanger 13. That is, the air-cooling mode is a heat-medium cooling mode in which the heat medium is cooled in the first coolant-refrigerant heat exchanger 13.

The coolant cooled in the first coolant-refrigerant heat exchanger 13 cools the ventilation air to be blown into the vehicle interior, in the cooler core 23. In this way, the vehicle interior can be cooled.

The coolant heated in the second coolant-refrigerant heat exchanger 14 heats the ventilation air to be blown into the vehicle interior, in the heater core 24. Thus, the cold air cooled by the cooler core 23 is reheated and thereby can be used for air-cooling at a desired temperature.

In the air-cooling mode, the refrigerant flows through the first air-refrigerant heat exchanging portion 121, the gas-liquid separating portion 122, and the second air-refrigerant heat exchanging portion 123 in this order within the air-refrigerant heat exchanger 12. The gas-liquid two-phase refrigerant having heat exchanged in the first air-refrigerant heat exchanging portion 121 flows out of the first refrigerant circulation port 122a into the gas-liquid separating portion 122. The refrigerant in the gas-liquid separating portion 122 flows out of the second refrigerant circulation port 122b into the second air-refrigerant heat exchanging portion 123.

The first refrigerant circulation port 122a is disposed on the upper side in the gravity direction with respect to the second refrigerant circulation port 122b. Thus, the refrigerant is separated into a gas-phase refrigerant and a liquid-phase refrigerant in the gas-liquid separating portion 122, and consequently the liquid-phase refrigerant is retained at the bottom of the gas-liquid separating portion 122. Then, the liquid-phase refrigerant retained at the bottom of the gas-liquid separating portion 122 flows to the second air-refrigerant heat exchanging portion 123.

Therefore, the first air-refrigerant heat exchanging portion 121 functions as a condenser that condenses the refrigerant, while the second air-refrigerant heat exchanging portion 123 functions as a subcooler that enhances a subcooling degree of the refrigerant.

In the air-cooling mode, the refrigerant flows through the first coolant-refrigerant heat exchanging portion 131, the gas-liquid separating portion 132, and the second coolant-refrigerant heat exchanging portion 133 in this order within the first coolant-refrigerant heat exchanger 13. The misty gas-liquid two-phase refrigerant having heat exchanged in the first coolant-refrigerant heat exchanging portion 131 flows out of the first refrigerant circulation port 132a into the gas-liquid separating portion 132. The refrigerant in the gas-liquid separating portion 132 flows out of the second refrigerant circulation port 132b into the second coolant-refrigerant heat exchanging portion 133.

The first refrigerant circulation port 132a is disposed on the lower side in the gravity direction with respect to the second refrigerant circulation port 132b. Thus, the misty refrigerant flows into the second coolant-refrigerant heat exchanging portion 133 in the gas-liquid two-phase state as it is without being separated into gas and liquid phases in the gas-liquid separating portion 132.

Therefore, each of the first coolant-refrigerant heat exchanging portion 131 and the second coolant-refrigerant heat exchanging portion 133 functions as an evaporator that evaporates the refrigerant.

When the air-conditioning mode is the air-heating mode, the controller 40 switches the refrigerant flow switching valve 16 and the coolant flow switching valves 25 and 26 to an operation in the air-heating mode shown in FIGS. 3 and 8. Thus, the refrigerant circulates through the compressor 11, the first coolant-refrigerant heat exchanger 13, the expansion valve 15, the air-refrigerant heat exchanger 12, the second coolant-refrigerant heat exchanger 14, and the compressor 11 in this order. The coolant circulates between the first coolant-refrigerant heat exchanger 13 and the heater core 24, and the coolant circulates between the second coolant-refrigerant heat exchanger 14 and the cooler core 23.

In the air-heating mode, the first coolant-refrigerant heat exchanger 13 functions as the high-pressure side heat exchanger in the refrigeration cycle, while the second coolant-refrigerant heat exchanger 14 and the air-refrigerant heat exchanger 12 function as the low-pressure side heat exchanger in the refrigeration cycle. That is, the high-pressure side refrigerant in the refrigeration cycle dissipates heat in the first coolant-refrigerant heat exchanger 13, while the low-pressure side refrigerant in the refrigeration cycle absorbs heat in the second coolant-refrigerant heat exchanger 14 and the air-refrigerant heat exchanger 12.

Accordingly, the coolant is heated in the first coolant-refrigerant heat exchanger 13, while the coolant is cooled in the second coolant-refrigerant heat exchanger 14. That is, the air-heating mode is a heat-medium heating mode in which the heat medium is heated in the first coolant-refrigerant heat exchanger 13.

The coolant cooled in the second coolant-refrigerant heat exchanger 14 cools and dehumidifies the ventilation air to be blown into the vehicle interior, in the cooler core 23. The coolant heated in the first coolant-refrigerant heat exchanger 13 heats the ventilation air to be blown into the vehicle interior, in the heater core 24. Thus, the cold air cooled and dehumidified by the cooler core 23 is heated and thereby can be used for dehumidifying and air-heating at a desired temperature.

In the air-heating mode, the refrigerant flows through the second coolant-refrigerant heat exchanging portion 133, the gas-liquid separating portion 132, and the first coolant-refrigerant heat exchanging portion 131 in this order within the first coolant-refrigerant heat exchanger 13. The gas-liquid two-phase refrigerant having heat exchanged in the second coolant-refrigerant heat exchanging portion 133 flows out of the second refrigerant circulation port 132b into the gas-liquid separating portion 132. The refrigerant in the gas-liquid separating portion 132 flows out of the first refrigerant circulation port 132a into the first coolant-refrigerant heat exchanging portion 131.

The first refrigerant circulation port 132a is disposed on the lower side in the gravity direction with respect to the second refrigerant circulation port 132b. Thus, the refrigerant is separated into a gas-phase refrigerant and a liquid-phase refrigerant in the gas-liquid separating portion 132, and consequently the liquid-phase refrigerant is retained at the bottom of the gas-liquid separating portion 132. Then, the liquid-phase refrigerant retained at the bottom of the gas-liquid separating portion 132 flows to the first coolant-refrigerant heat exchanging portion 131.

Therefore, the second coolant-refrigerant heat exchanging portion 133 functions as a condenser that condenses the refrigerant, while the first coolant-refrigerant heat exchanging portion 131 functions as a subcooler that enhances a subcooling degree of the refrigerant.

In the air-heating mode, the refrigerant flows through the second air-refrigerant heat exchanging portion 123, the gas-liquid separating portion 122, and the first air-refrigerant heat exchanging portion 121 in this order within the air-refrigerant heat exchanger 12. The misty gas-liquid two-phase refrigerant having heat exchanged in the second air-refrigerant heat exchanging portion 123 flows out of the second refrigerant circulation port 122b into the gas-liquid separating portion 122. The refrigerant in the gas-liquid separating portion 122 flows out of the first refrigerant circulation port 122a into the first air-refrigerant heat exchanging portion 121.

The first refrigerant circulation port 122a is disposed on the upper side in the gravity direction with respect to the second refrigerant circulation port 122b. Thus, the misty refrigerant flows into the first air-refrigerant heat exchanging portion 121 in the gas-liquid two-phase state as it is without being separated into gas and liquid phases in the gas-liquid separating portion 122.

Therefore, each of the second air-refrigerant heat exchanging portion 123 and the first air-refrigerant heat exchanging portion 121 functions as an evaporator that evaporates the refrigerant.

When frost formation occurs at the air-refrigerant heat exchanger 12 in the air-heating mode, the refrigeration cycle is switched to the air-cooling mode, thereby enabling defrost of the air-refrigerant heat exchanger 12. That is, by switching to the air-cooling mode, the heat of the high-pressure side refrigerant in the refrigeration cycle can be used to defrost the air-refrigerant heat exchanger 12.

In this embodiment, the refrigerant flow switching valve 16 switches between a coolant-cooling mode and a coolant-heating mode. In the coolant-cooling mode, the refrigerant circulates through the compressor 11, the air-refrigerant heat exchanger 12, the expansion valve 15, the first coolant-refrigerant heat exchanger 13, and the compressor 11 in this order, and the coolant is cooled in the first coolant-refrigerant heat exchanger 13. In the coolant-heating mode, the refrigerant circulates through the compressor 11, the first coolant-refrigerant heat exchanger 13, the expansion valve 15, the air-refrigerant heat exchanger 12, and the compressor 11 in this order, and the coolant is heated in the first coolant-refrigerant heat exchanger 13.

The coolant flow switching valves 25 and 26 switch the flow of the coolant such that the coolant circulates between the first coolant-refrigerant heat exchanger 13 and the cooler core 23 in the coolant-cooling mode, and that the coolant circulates between the first coolant-refrigerant heat exchanger 13 and the heater core 24 in the coolant-heating mode.

With this arrangement, in the coolant-cooling mode, the cold heat of the coolant cooled by the first coolant-refrigerant heat exchanger 13 can be utilized in the cooler core 23, while in the coolant-heating mode, the hot heat of the coolant heated by the first coolant-refrigerant heat exchanger 13 can be utilized in the heater core 24.

In the coolant-cooling mode, the refrigerant dissipates heat directly into the air in the air-refrigerant heat exchanger 12, thereby making it possible to improve the refrigeration cycle efficiency, as compared to a case in which the refrigerant dissipates heat into the air via the coolant.

That is, in the air-refrigerant heat exchanger 12, the refrigerant exchanges heat directly with air. Thus, the refrigerant is mainly in a gas-liquid two-phase state, and thereby the temperature efficiency of the air with respect to the refrigerant is in a range of 75 to 85% in general use. The "general use" as used herein means a state in which an air speed is approximately 2 m/s in the air-refrigerant heat exchanger 12.

A heat exchanger that exchanges heat between the coolant and the air has a temperature efficiency of 50 to 60% on the same conditions. By comparison, this embodiment can significantly improve the temperature efficiency, thereby improving the refrigeration cycle efficiency.

In the coolant-heating mode, the refrigerant dissipates heat into the air via the coolant in the first coolant-refrigerant heat exchanger 13 and the heater core 24, resulting in reduction in the refrigeration cycle efficiency. However, the reduction in the refrigeration cycle efficiency raises the high-pressure in the refrigeration cycle, thereby improving the air-heating performance of the heater core 24. That is, the improvement in the air-heating performance of the heater core 24 can compensate for the reduction of the refrigeration cycle efficiency.

In this embodiment, the air-refrigerant heat exchanger 12 has a first gas-liquid separating portion 122 that separates the refrigerant into a gas-phase refrigerant and a liquid-phase refrigerant and flows out the liquid-phase refrigerant in the coolant-cooling mode. The first coolant-refrigerant heat exchanger 13 has a second gas-liquid separating portion 132 that separates the refrigerant into a gas-phase refrigerant and a liquid-phase refrigerant and flows out the liquid-phase refrigerant in the coolant-heating mode.

Thus, in either the coolant-cooling mode or the coolant-heating mode, the high-pressure side refrigerant in the refrigeration cycle can be separated into a gas-phase refrigerant and a liquid-phase refrigerant, thereby improving the refrigeration cycle efficiency.

In this embodiment, the refrigerant flow switching valve 16 reverses the flow direction of the coolant in the air-refrigerant heat exchanger 12 and the first coolant-refrigerant heat exchanger 13 in response to either the coolant-cooling mode or the coolant-heating mode.

Thus, in the coolant-cooling mode, the refrigerant can be prevented from being separated into a gas-phase refrigerant and a liquid-phase refrigerant at the second gas-liquid separating portion 132 of the first coolant-refrigerant heat exchanger 13, positioned on the low-pressure side. Likewise, in the coolant-heating mode, the refrigerant can be prevented from being separated into a gas-phase refrigerant and a liquid-phase refrigerant at the first gas-liquid separating portion 122 of the air-refrigerant heat exchanger 12, positioned on the low-pressure side. That is, in either the coolant-cooling mode or the coolant-heating mode, the refrigerant can be prevented from being separated into a gas-phase refrigerant and a liquid-phase refrigerant within the low-pressure side heat exchanger in the refrigeration cycle.

In this embodiment, the air-refrigerant heat exchanger 12 includes the first air-refrigerant heat exchanging portion 121 and the second air-refrigerant heat exchanging portion 123, which are adapted to exchange heat between the air and the refrigerant. The first gas-liquid separating portion 122 of the air-refrigerant heat exchanger 12 is disposed between the first air-refrigerant heat exchanging portion 121 and the second air-refrigerant heat exchanging portion 123 in the flow direction of the refrigerant.

Thus, the second air-refrigerant heat exchanging portion 123 of the air-refrigerant heat exchanger 12 can subcool the refrigerant cooled by the first air-refrigerant heat exchanging portion 121 in the coolant-cooling mode and can exchange heat between the air and the refrigerant decompressed by the expansion valve 15 in the coolant-heating mode. Thus, in either the coolant-cooling mode or the coolant-heating mode, the refrigeration cycle efficiency can be improved.

In this embodiment, the first coolant-refrigerant heat exchanger 13 includes the first coolant-refrigerant heat exchanging portion 131 and the second coolant-refrigerant heat exchanging portion 133, which are adapted to exchange heat between the air and the refrigerant. The second gas-liquid separating portion 132 of the first coolant-refrigerant heat exchanger 13 is disposed between the first coolant-refrigerant heat exchanging portion 131 and the second coolant-refrigerant heat exchanging portion 133 in the flow direction of the refrigerant.

Thus, the second coolant-refrigerant heat exchanging portion 133 of the first coolant-refrigerant heat exchanger 13 can exchange heat between the air and the refrigerant decompressed by the expansion valve 15 in the coolant-cooling mode and can subcool the refrigerant cooled by the first air-refrigerant heat exchanging portion 121 in the coolant-heating mode. Thus, in either the coolant-cooling mode or the coolant-heating mode, the refrigeration cycle efficiency can be improved.

In this embodiment, in the coolant-cooling mode, the first air-refrigerant heat exchanging portion 121 is positioned on the upstream side of the refrigerant flow with respect to the second air-refrigerant heat exchanging portion 123. The first air-refrigerant heat exchanging portion 121 and the second air-refrigerant heat exchanging portion 123 are configured such that the heat exchanging amount of the first air-refrigerant heat exchanging portion 121 is set larger than the heat exchanging amount of the second air-refrigerant heat exchanging portion 123.

Thus, when the air-refrigerant heat exchanger 12 is disposed on the high-pressure side of the refrigeration cycle, the refrigeration cycle efficiency can be improved because of the good balance in the heat exchanging amount between the first air-refrigerant heat exchanging portion 121 that condenses the refrigerant and the second air-refrigerant heat exchanging portion 123 that subcools the refrigerant.

In this embodiment, in the coolant-heating mode, the second coolant-refrigerant heat exchanging portion 133 is positioned on the upstream side of the refrigerant flow with respect to the first coolant-refrigerant heat exchanging portion 131. Further, the first coolant-refrigerant heat exchanging portion 131 and the second coolant-refrigerant heat exchanging portion 133 are configured such that the heat exchanging amount of the second coolant-refrigerant heat exchanging portion 133 is set larger than the heat exchanging amount of the first coolant-refrigerant heat exchanging portion 131.

Thus, when the first coolant-refrigerant heat exchanger 13 is disposed on the high-pressure side of the refrigeration cycle, the refrigeration cycle efficiency can be improved because of the good balance in the heat exchanging amount between the second coolant-refrigerant heat exchanging portion 133 that condenses the refrigerant and the first coolant-refrigerant heat exchanging portion 131 that subcools the refrigerant.

In this embodiment, the air-refrigerant heat exchanger 12 has its flow-path cross-sectional area for the refrigerant decreased from the upstream side to downstream side in the flow direction of the refrigerant when exchanging heat with the refrigerant provided before being decompressed by the expansion valve 15. Meanwhile, the air-refrigerant heat exchanger 12 has its flow-path cross-sectional area for the refrigerant increased from the upstream side to downstream side of the flow direction of the refrigerant when exchanging heat with the refrigerant provided after being decompressed by the expansion valve 15.

Thus, the air-refrigerant heat exchanger 12 has its flow-path cross-sectional area decreased in response to a decrease in the dryness of the refrigerant when exchanging heat with the refrigerant provided before being decompressed by the expansion valve 15. Meanwhile, the air-refrigerant heat exchanger 12 has its flow-path cross-sectional area increased in response to an increase in the dryness of the refrigerant when exchanging heat with the refrigerant provided after being decompressed by the expansion valve 15. In this way, the heat exchanger performance of the air-refrigerant heat exchanger 12 can be improved.

Likewise, the first coolant-refrigerant heat exchanger 13 has its flow-path cross-sectional area for the refrigerant decreased from the upstream side to downstream side in the flow direction of the refrigerant when exchanging heat with the refrigerant provided before being decompressed by the expansion valve 15. Meanwhile, the first coolant-refrigerant heat exchanger 13 has its flow-path cross-sectional area for the refrigerant increased from the upstream side to downstream side of the flow of the refrigerant when exchanging heat with the refrigerant provided after being decompressed by the expansion valve 15.

Thus, the first coolant-refrigerant heat exchanger 13 has its flow-path cross-sectional area decreased in response to a decrease in the dryness of the refrigerant when exchanging heat with the refrigerant provided before being decompressed by the expansion valve 15. Meanwhile, the first coolant-refrigerant heat exchanger 13 has its flow-path cross-sectional area increased in response to an increase in the dryness of the refrigerant when exchanging heat with the refrigerant provided after being decompressed at the expansion valve 15. In this way, the heat exchanger performance of the first coolant-refrigerant heat exchanger 13 can be improved.

In this embodiment, the cooler core 23 causes the coolant to circulate between the cooler core 23 and one of the first coolant-refrigerant heat exchanger 13 and the second coolant-refrigerant heat exchanger 14 that exchanges heat between the coolant and the refrigerant after being decompressed by the expansion valve 15.

The heater core 24 causes the coolant to circulate between the heater core 24 and one of the first coolant-refrigerant heat exchanger 13 and the second coolant-refrigerant heat exchanger 14 that exchanges heat between the coolant and the refrigerant provided before being decompressed at the expansion valve 15.

With this arrangement, the cooler core 23 can utilize the cold heat of the coolant cooled by one of the first and second coolant-refrigerant heat exchangers 13 and 14, while the heater core 24 can utilize the hot heat of the coolant heated by the other of the first and second coolant-refrigerant heat exchangers 13 and 14.

The refrigerant dissipates heat directly into the air in the air-refrigerant heat exchanger 12, thereby making it possible to improve the refrigeration cycle efficiency, as compared to a case in which the refrigerant dissipates heat into the air via the coolant.

In this embodiment, in the coolant-cooling mode, the refrigerant flow switching valve 16 causes the refrigerant provided before being decompressed by the expansion valve 15 to flow into the second coolant-refrigerant heat exchanger 14. Further, the coolant flow switching valves 25 and 26 cause the coolant to circulate between the second coolant-refrigerant heat exchanger 14 and the heater core 24.

In the coolant-heating mode, the refrigerant flow switching valve 16 causes the refrigerant provided after being decompressed by the expansion valve 15 to flow into the second coolant-refrigerant heat exchanger 14. Further, the coolant flow switching valves 25 and 26 cause the coolant to circulate between the second coolant-refrigerant heat exchanger 14 and the cooler core 23.

With this arrangement, in the coolant-cooling mode, the cold heat of the coolant cooled by the first coolant-refrigerant heat exchanger 13 can be utilized in the cooler core 23, while the hot heat of the coolant heated by the second coolant-refrigerant heat exchanger 14 can be utilized in the heater core 24.

In the coolant-heating mode, the cold heat of the coolant cooled by the second coolant-refrigerant heat exchanger 14 can be utilized in the cooler core 23, while the hot heat of the coolant heated by the first coolant-refrigerant heat exchanger 13 can be utilized in the heater core 24.

The refrigerant dissipates heat directly into the air in the air-refrigerant heat exchanger 12, thereby making it possible to improve the refrigeration cycle efficiency, as compared to a case in which the refrigerant dissipates heat into the air via the coolant.

In this embodiment, the controller 40 temporarily stops the operation of the compressor 11 when switching between the coolant-cooling mode and the coolant-heating mode.

The pump control unit 40d maintains at least one of the first coolant pump 21 and the second coolant pump 22 in an operating state when switching between the coolant-cooling mode and the coolant-heating mode.

Thus, the use of at least one of the cold heat in the cooler core 23 and the hot heat in the heater core 24 can be maintained while suppressing the adverse effect, such as a load or refrigerant hammer sound, generated when switching between the coolant-cooling mode and the coolant-heating mode.

In this embodiment, in an operating state where the temperature of the refrigerant having heat exchanged in the air-refrigerant heat exchanger 12 falls below the freezing point, the controller 40 increases or decreases the flow rate of the coolant circulating through the second coolant-refrigerant heat exchanger 14.

Thus, the frost at the cooler core 23 can be prevented to thereby suppress the reduction in the cycle performance, so that the hot heat can be utilized efficiently in the heater core 24.

The flow rate of the coolant circulating through the second coolant-refrigerant heat exchanger 14 may be increased or decreased by a water valve.

In this embodiment, when frost adhering to the air-refrigerant heat exchanger 12 needs to be melted, the refrigerant flow switching valve 16 and the controller 40 are adapted to switch the refrigerant flow such that the air-refrigerant heat exchanger 12 is positioned on the upstream side of the refrigerant flow with respect to the expansion valve 15 and that the first coolant-refrigerant heat exchanger 13 is positioned on the downstream side of the refrigerant flow with respect to the expansion valve 15.

Thus, the frost adhering to the air-refrigerant heat exchanger 12 can be melted by using heat of the refrigerant discharged from the compressor 11.

Second Embodiment

In the above-mentioned embodiment, the expansion valve 15 is the bidirectional expansion valve capable of decompressing and expanding the refrigerant even when the refrigerant flows back. Meanwhile, in this embodiment, the expansion valve 15 is a one-way expansion valve incapable of decompressing and expanding the refrigerant when the refrigerant flows back.

Figure 11:
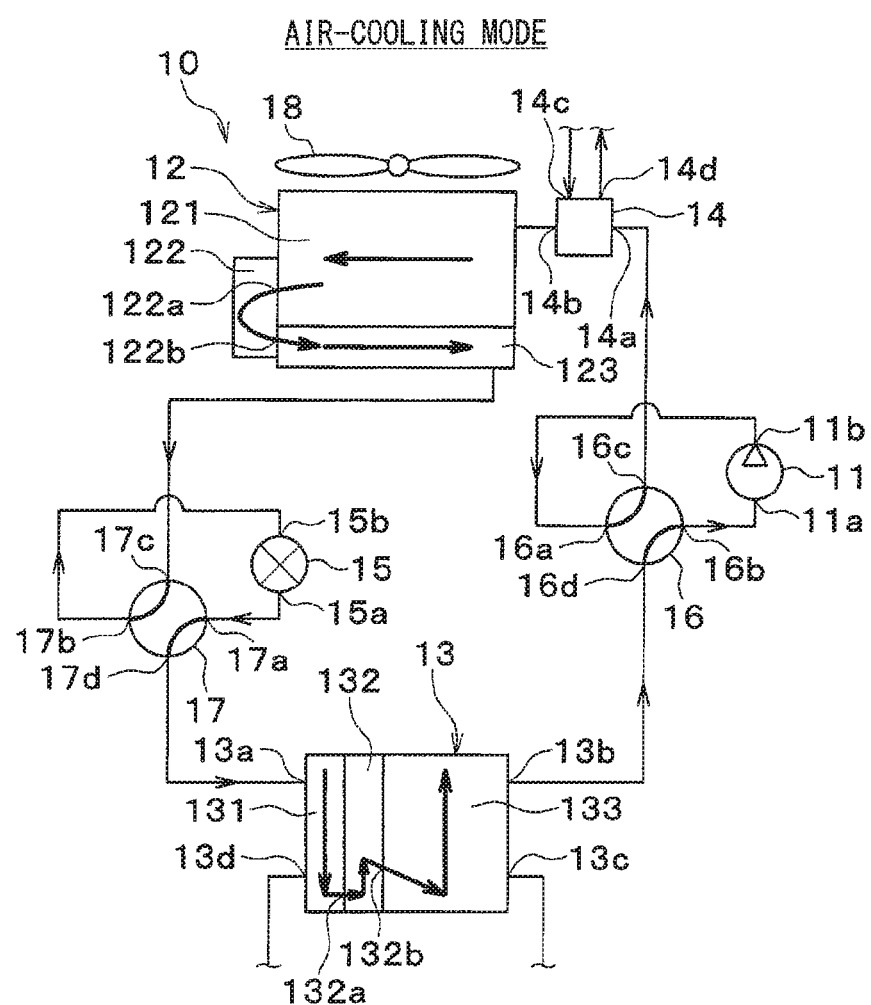
FIG. 11 is an entire configuration diagram of a refrigeration cycle device in a second embodiment, while showing an air-cooling mode.
Figure 12:
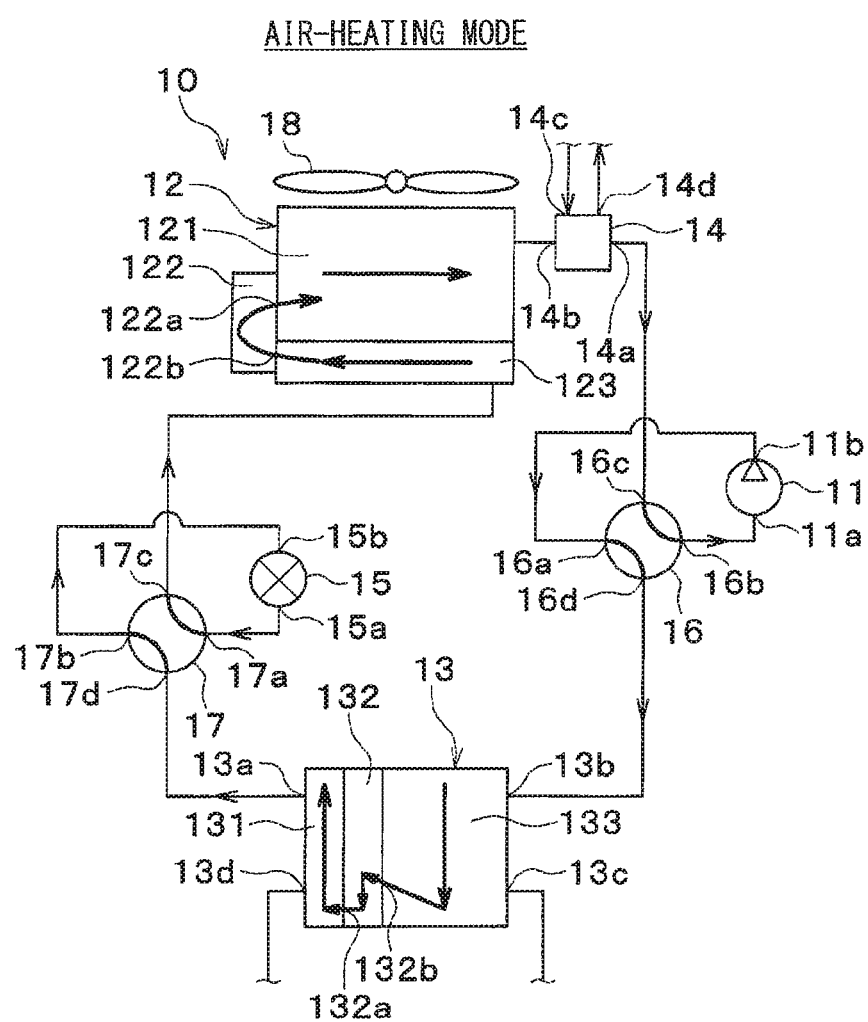
FIG. 12 is an entire configuration diagram of the refrigeration cycle device in the second embodiment, while showing an air-heating mode.

As shown in FIGS. 11 and 12, the refrigeration cycle device 10 includes an expansion-valve refrigerant flow switching valve 17. The expansion-valve refrigerant flow switching valve 17 constantly aligns the refrigerant flow direction relative to the expansion valve 15 in the same direction, irrespective of the air-conditioning mode. The expansion-valve refrigerant flow switching valve 17 is a decompression refrigerant-flow switch that causes the air-cooling mode and the air-heating mode to have the same flow direction of the refrigerant in the expansion valve 15 as the decompression device. The operation of the expansion-valve refrigerant flow switching valve 17 is controlled by the controller 40.

The expansion-valve refrigerant flow switching valve 17 includes: a refrigerant inflow port 17a from which the refrigerant flows into the expansion-valve refrigerant flow switching valve 17; a refrigerant outflow port 17b through which the refrigerant flows out of the expansion-valve refrigerant flow switching valve 17; and a first inflow/outflow port 17c and a second inflow/outflow port 17d through which the refrigerant flows into or out of the expansion-valve refrigerant flow switching valve 17.

The refrigerant inflow port 17a is connected to a side of the refrigerant outlet 15a of the expansion valve 15. The refrigerant outflow port 17b is connected to a side of the refrigerant inlet 15b of the expansion valve 15. The first inflow/outflow port 17c is connected to the air-refrigerant heat exchanger 12. The second inflow/outflow port 17d is connected to the first coolant-refrigerant heat exchanging portion 131 of the first coolant-refrigerant heat exchanger 13.

The expansion-valve refrigerant flow switching valve 17 switches between a state in which the refrigerant inflow port 17a is connected to the first inflow/outflow port 17c, and the refrigerant outflow port 17b is connected to the second inflow/outflow port 17d, and a state in which the refrigerant inflow port 17a is connected to the second inflow/outflow port 17d and the refrigerant outflow port 17b is connected to the first inflow/outflow port 17c.

As shown in FIG. 11, when the air-conditioning mode is the air-cooling mode, the expansion-valve refrigerant flow switching valve 17 connects between the refrigerant inflow port 17a and the second inflow/outflow port 17d, and connects between the refrigerant outflow port 17b and the first inflow/outflow port 17c. In other words, when the air-conditioning mode is the air-cooling mode, the expansion-valve refrigerant flow switching valve 17 connects between the air-refrigerant heat exchanger 12 and the refrigerant inlet 15b of the expansion valve 15, and connects between the refrigerant outlet 15a of the expansion valve 15 and the first coolant-refrigerant heat exchanger 13.

As shown in FIG. 12, when the air-conditioning mode is the air-heating mode, the expansion-valve refrigerant flow switching valve 17 connects between the refrigerant inflow port 17a and the first inflow/outflow port 17c, and connects between the refrigerant outflow port 17b and the second inflow/outflow port 17d. In other words, when the air-conditioning mode is the air-heating mode, the expansion-valve refrigerant flow switching valve 17 connects between the first coolant-refrigerant heat exchanger 13 and the refrigerant inlet 15b of the expansion valve 15, and connects between the refrigerant outlet 15a of the expansion valve 15 and the air-refrigerant heat exchanger 12.

Thus, the refrigerant can be decompressed and expanded by the expansion valve 15 in both the air-cooling mode and the air-heating mode even when the expansion valve 15 is not the bidirectional expansion valve but the one-way expansion valve.

Third Embodiment

In the above-mentioned second embodiment, the air-refrigerant heat exchanger 12 has the gas-liquid separating portion 122, and the first coolant-refrigerant heat exchanger 13 has the gas-liquid separating portion 132. Meanwhile, in this embodiment, as shown in FIGS. 13 and 14, an accumulator 118 is provided in place of the gas-liquid separating portions 122 and 132.

The accumulator 118 is disposed between the refrigerant outflow port 16b of the refrigerant flow switching valve 16 and the refrigerant suction port 11a of the compressor 11.

Figure 13:
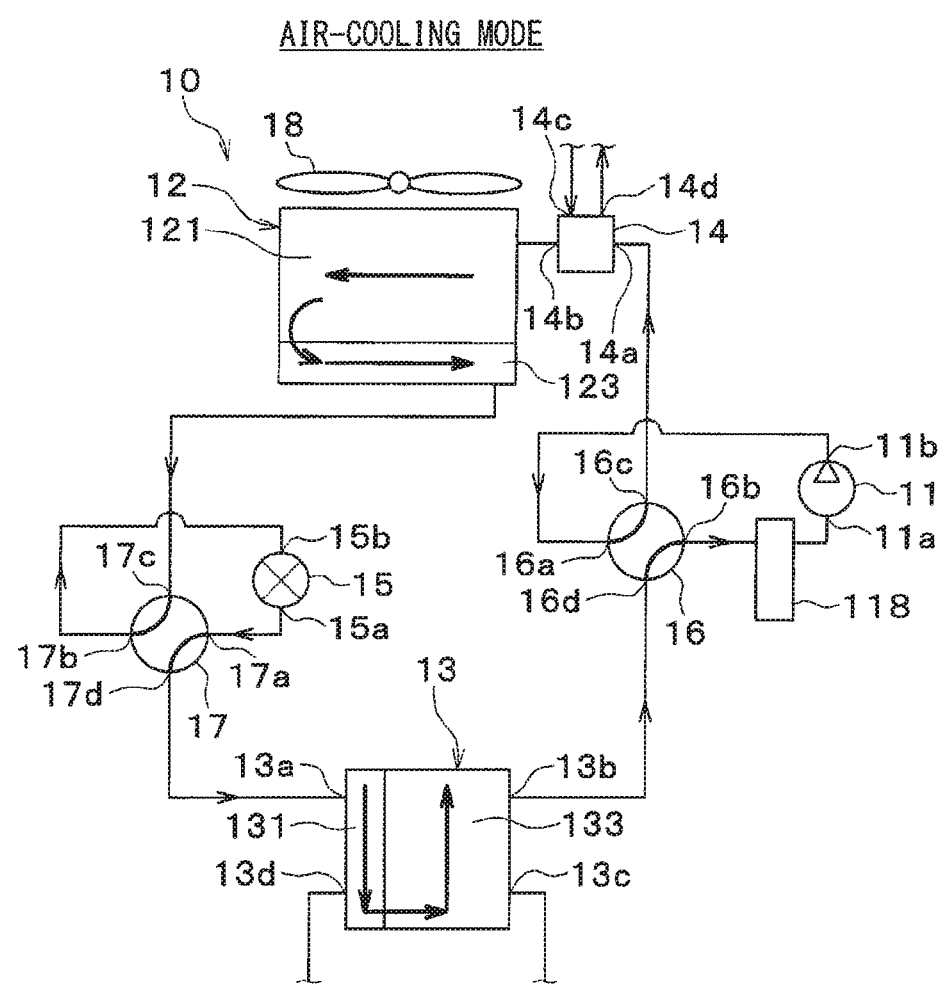
FIG. 13 is an entire configuration diagram of a refrigeration cycle device in a third embodiment, while showing an air-cooling mode.

As shown in FIG. 13, when the air-conditioning mode is the air-cooling mode, the refrigerant flows out of the first coolant-refrigerant heat exchanger 13 into the accumulator 118. The refrigerant is separated into the gas-phase refrigerant and the liquid-phase refrigerant by the accumulator 118. The separated gas-phase refrigerant is drawn into the compressor 11, while the separated liquid-phase refrigerant is stored in the accumulator 118.

Figure 14:
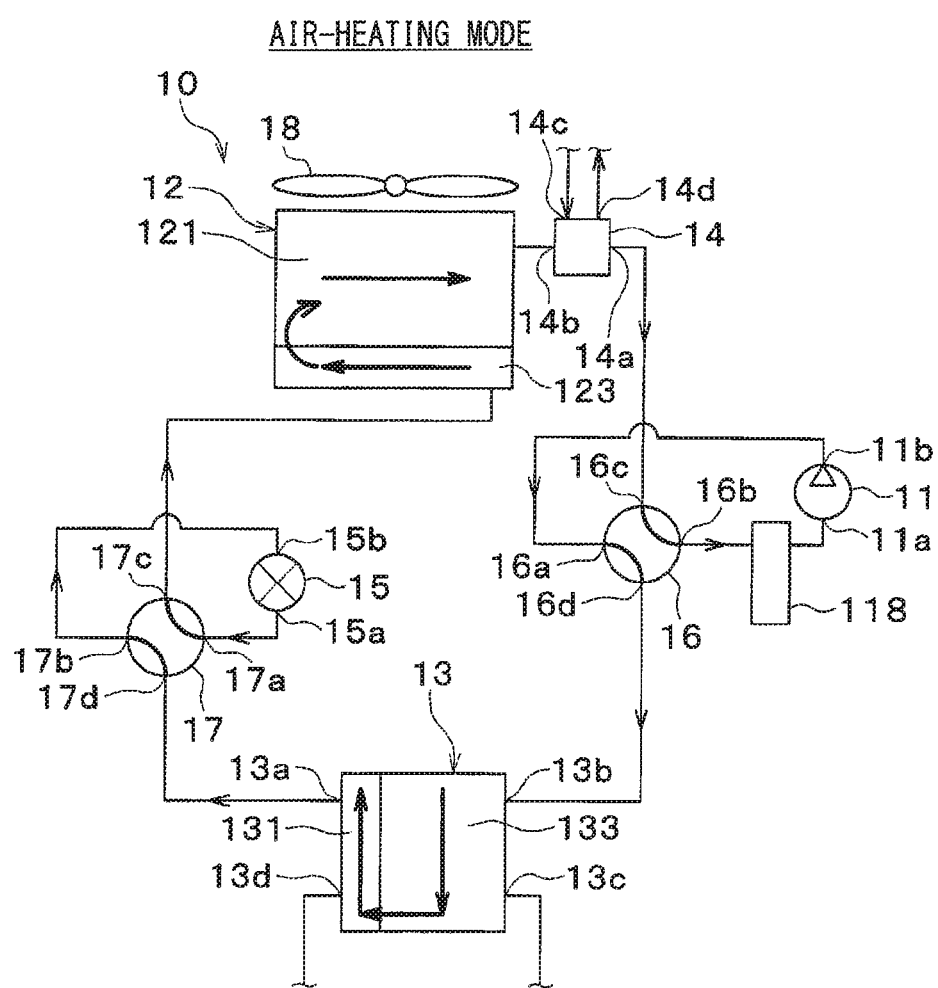
FIG. 14 is an entire configuration diagram of the refrigeration cycle device in the third embodiment, while showing an air-heating mode.

As shown in FIG. 14, when the air-conditioning mode is the air-heating mode, the refrigerant flows out of the second coolant-refrigerant heat exchanger 14 into the accumulator 118. The refrigerant is separated into the gas-phase refrigerant and the liquid-phase refrigerant by the accumulator 118. The separated gas-phase refrigerant is drawn into the compressor 11, while the separated liquid-phase refrigerant is stored in the accumulator 118.

This embodiment can also exhibit the same functions and effects as in the second embodiment described above.

Fourth Embodiment

Figure 15:
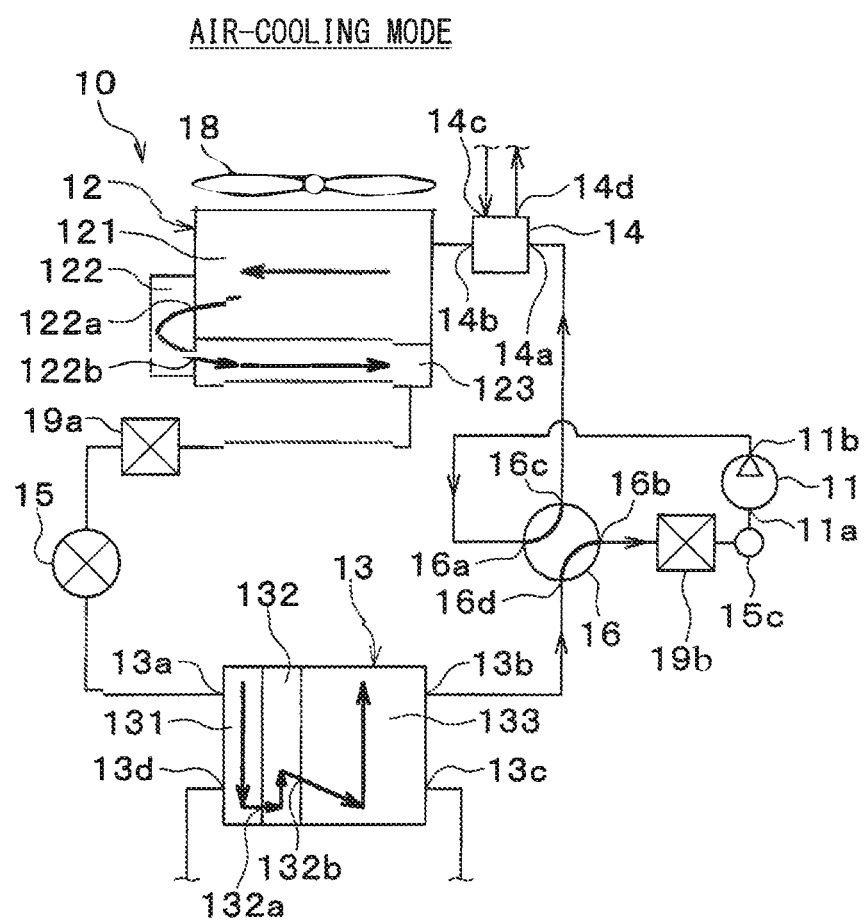
FIG. 15 is an entire configuration diagram of a refrigeration cycle device in a fourth embodiment, while showing an air-cooling mode.
Figure 16:
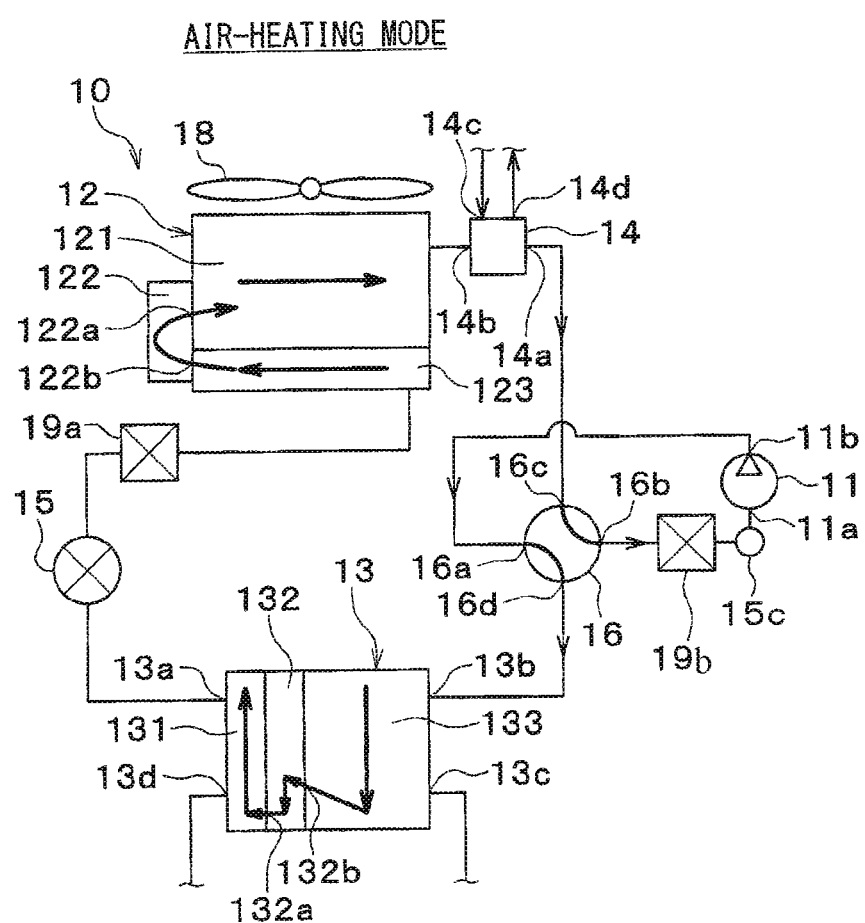
FIG. 16 is an entire configuration diagram of the refrigeration cycle device in the fourth embodiment, while showing an air-heating mode.

As shown in FIGS. 15 and 16, in this embodiment, an internal heat exchanger 19 is added to the structure of the first embodiment mentioned above.

The internal heat exchanger 19 has a high-pressure side refrigerant passage 19a and a low-pressure side refrigerant passage 19b. The high-pressure side refrigerant passage 19a is disposed between the air-refrigerant heat exchanger 12 and the expansion valve 15. The low-pressure side refrigerant passage 19*b* is disposed between the refrigerant outflow port 16*b* of the refrigerant flow switching valve 16 and the refrigerant suction port 11*a* of the compressor 11.

At this time, the internal heat exchanger 19 is a heat exchanger that exchanges heat between the high-pressure side refrigerant circulating through the high-pressure side refrigerant passage 19*a* and the low-pressure side refrigerant circulating through the low-pressure side refrigerant passage 19*b*.

A thermo-sensitive portion 15*c* of the expansion valve 15 is disposed between the low-pressure side refrigerant passage 19*b* and the refrigerant suction port 11*a* of the compressor 11.

The thermo-sensitive portion 15*c* detects the superheat degree of the refrigerant based on the temperature and pressure of the refrigerant. The expansion valve 15 has a mechanical mechanism (not shown) that adjusts a throttle passage area such that a refrigerant superheat degree detected by the thermo-sensitive portion 15*c* is within a predetermined range previously set.

Instead of the thermo-sensitive portion 15*c*, a temperature sensor may be disposed between the low-pressure side refrigerant passage 19*b* and the refrigerant suction port 11*a* of the compressor 11, and the expansion valve 15 may adjust the throttle passage area such that a refrigerant temperature detected by the temperature sensor is within a predetermined range previously set.

As shown in FIG. 15, when the air-conditioning mode is the air-cooling mode, the high-pressure side refrigerant having heat exchanged in the air-refrigerant heat exchanger 12 flows through the high-pressure side refrigerant passage 19*a*, and the low-pressure side refrigerant having heat exchanged at the first coolant-refrigerant heat exchanger 13 flows through the low-pressure side refrigerant passage 19*b*.

Thus, the heat exchange is performed between the high-pressure side refrigerant, which has heat exchanged in the air-refrigerant heat exchanger 12, and the low-pressure side refrigerant, which has heat exchanged in the first coolant-refrigerant heat exchanger 13, thereby reducing the enthalpy of the refrigerant at the inlet side of the first coolant-refrigerant heat exchanger 13. Accordingly, a difference in the enthalpy (in short, a refrigeration capacity) between the outlet side refrigerant and the inlet-side refrigerant in the first coolant-refrigerant heat exchanger 13 can be enlarged to thereby improve a coefficient of performance of the cycle (i.e., COP).

As shown in FIG. 16, when the air-conditioning mode is the air-heating mode, the high-pressure side refrigerant decompressed and expanded by the expansion valve 15 flows through the high-pressure side refrigerant passage 19*a*, and the low-pressure side refrigerant having heat exchanged in the first coolant-refrigerant heat exchanger 13 flows through the low-pressure side refrigerant passage 19*b*.

The amount of the refrigerant required for the air-heating mode becomes less than the amount of the refrigerant required for the air-cooling mode. In the air-heating mode, an excess refrigerant needs to be stored in the gas-liquid separating portion 132 of the first coolant-refrigerant heat exchanger 13.

In the air-heating mode of this embodiment, the liquid-rich low-pressure side refrigerant can be stored in the low-pressure side refrigerant passage 19*b*, thereby reducing the capacity of the gas-liquid separating portion 132 in the first coolant-refrigerant heat exchanger 13.

In this embodiment, the low-pressure side refrigerant passage 19*b* of the internal heat exchanger 19 is disposed between the refrigerant flow switching valve 16 and the compressor 11.

Thus, in the coolant-cooling mode, the heat exchange can be performed between the refrigerant having heat exchanged in the air-refrigerant heat exchanger 12 and the refrigerant having heat exchanged in the first coolant-refrigerant heat exchanger 13, thereby improving the cycle efficiency.

In either the coolant-cooling mode or the coolant-heating mode, the low-pressure side refrigerant passage 19*b* can be positioned on the refrigerant suction side of the compressor 11.

In this embodiment, in either the coolant-cooling mode or the coolant-heating mode, the superheat degree of the refrigerant on the outlet side of the low-pressure side heat exchanger is controlled based on the temperature of the refrigerant at the outlet of the low-pressure side heat exchanger, sensed by the thermo-sensitive portion 15*c*.

Thus, a control point of the superheat degree of the refrigerant before switching between the coolant-cooling mode and the coolant-heating mode can be set identical to that after the switching therebetween. Thus, this embodiment can smoothly switch between the coolant-cooling mode and the coolant-heating mode.

Fifth Embodiment

Figure 17:
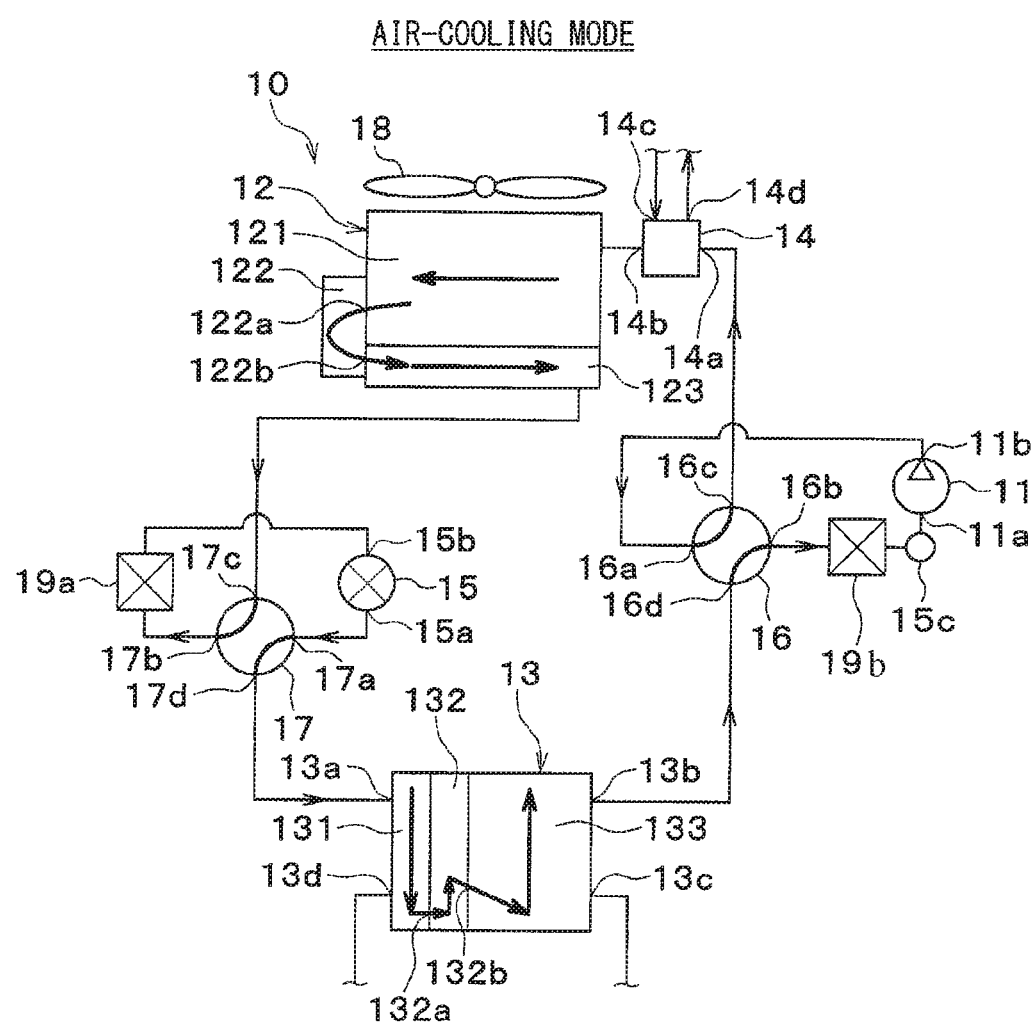
FIG. 17 is an entire configuration diagram of a refrigeration cycle device in a fifth embodiment, while showing an air-cooling mode.
Figure 18:
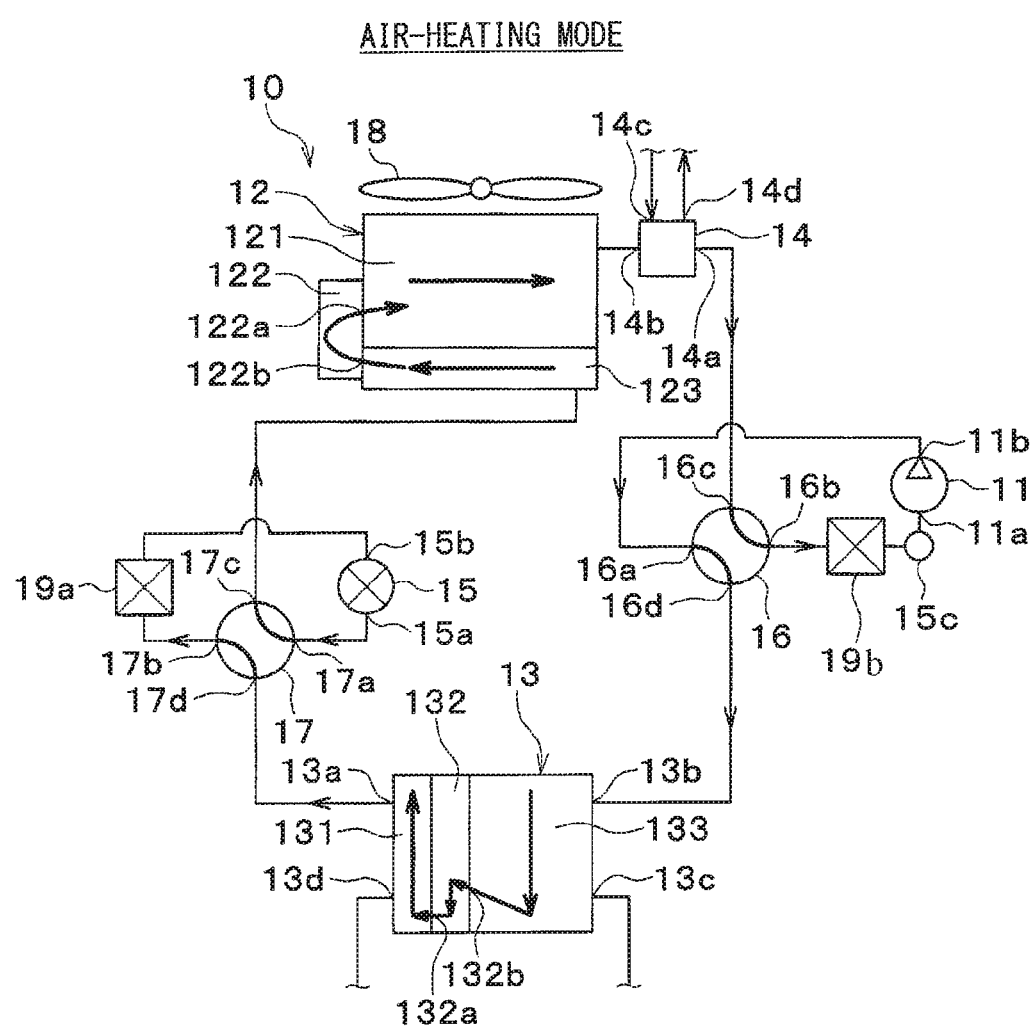
FIG. 18 is an entire configuration diagram of the refrigeration cycle device in the fifth embodiment, while showing an air-heating mode.

As shown in FIGS. 17 and 18, in this embodiment, an internal heat exchanger 19 is added to the structure of the second embodiment mentioned above.

The high-pressure side refrigerant passage 19*a* in the internal heat exchanger 19 is disposed between the refrigerant outflow port 17*b* of the expansion-valve refrigerant flow switching valve 17 and the refrigerant inlet 15*b* of the expansion valve 15. The low-pressure side refrigerant passage 19*b* in the internal heat exchanger 19 is disposed between the refrigerant outflow port 16*b* of the refrigerant flow switching valve 16 and the refrigerant suction port 11*a* of the compressor 11.

The thermo-sensitive portion 15*c* of the expansion valve 15 is disposed between the low-pressure side refrigerant passage 19*b* and the refrigerant suction port 11*a* of the compressor 11.

As shown in FIG. 17, when the air-conditioning mode is the air-cooling mode, the high-pressure side refrigerant that has heat exchanged in the air-refrigerant heat exchanger 12 flows through the high-pressure side refrigerant passage 19*a*, and the low-pressure side refrigerant that has heat exchanged in the first coolant-refrigerant heat exchanger 13 flows through the low-pressure side refrigerant passage 19*b*.

Thus, the enthalpy of the refrigerant on the inlet side of the first coolant-refrigerant heat exchanger 13 is reduced, and thereby a difference in the enthalpy (in short, a refrigeration capacity) between the outlet-side refrigerant and the inlet-side refrigerant in the first coolant-refrigerant heat exchanger 13 can be enlarged to thereby improve a coefficient of performance of the cycle (i.e., COP).

As shown in FIG. 18, when the air-conditioning mode is the air-heating mode, the high-pressure side refrigerant that has heat exchanged in the first coolant-refrigerant heat exchanger 13 flows through the high-pressure side refrigerant passage 19*a*, and the low-pressure side refrigerant that has heat exchanged in the air-refrigerant heat exchanger 12 flows through the low-pressure side refrigerant passage 19*b*.

Thus, the enthalpy of the refrigerant on the inlet side of the air-refrigerant heat exchanger 12 is reduced, and thereby a difference in the enthalpy (in short, a refrigeration capacity) between the outlet-side refrigerant and the inlet-side refrigerant in the air-refrigerant heat exchanger 12 can be enlarged to thereby improve a coefficient of performance of the cycle (i.e., COP).

In this embodiment, the high-pressure side refrigerant passage 19a is disposed between the expansion-valve refrigerant flow switching valve 17 and the expansion valve 15.

Thus, in both the coolant-cooling mode and the coolant-heating mode, the heat exchange can be performed between the refrigerant having heat exchanged in the air-refrigerant heat exchanger 12 and the refrigerant having heat exchanged in the first coolant-refrigerant heat exchanger 13, thereby improving the cycle efficiency.

The thermal energy of the high-pressure side refrigerant can be supplied to the expansion valve 15, so that the expansion valve 15 can be warmed at an ultralow temperature. Thus, the expansion valve 15 can be prevented from malfunctioning due to cooling down.

Sixth Embodiment

In the above-mentioned fifth embodiment, the high-pressure side refrigerant passage 19a in the internal heat exchanger 19 is disposed between the refrigerant outflow port 17b of the expansion-valve refrigerant flow switching valve 17 and the refrigerant inlet 15b of the expansion valve 15. In this embodiment, as shown in FIGS. 19 and 20, the high-pressure side refrigerant passage 19a of the internal heat exchanger 19 is disposed between the air-refrigerant heat exchanger 12 and the first inflow/outflow port 17c of the expansion-valve refrigerant flow switching valve 17.

Figure 19:
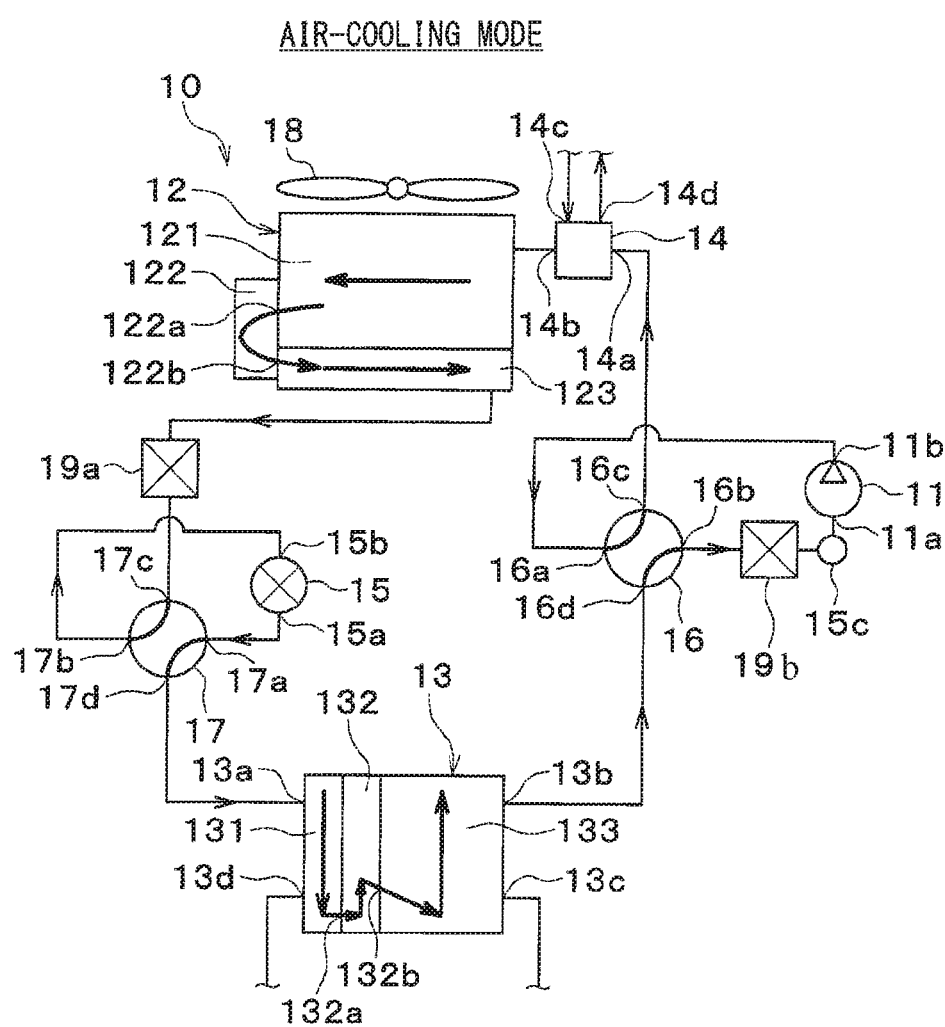
FIG. 19 is an entire configuration diagram of a refrigeration cycle device in a sixth embodiment, while showing an air-cooling mode.

As shown in FIG. 19, when the air-conditioning mode is the air-cooling mode, the high-pressure side refrigerant that has heat exchanged in the air-refrigerant heat exchanger 12 flows through the high-pressure side refrigerant passage 19a, and the low-pressure side refrigerant that has heat exchanged in the first coolant-refrigerant heat exchanger 13 flows through the low-pressure side refrigerant passage 19b.

Thus, the enthalpy of the refrigerant on the inlet side of the first coolant-refrigerant heat exchanger 13 is reduced, and thereby a difference in the enthalpy (refrigeration capacity) between the outlet-side refrigerant and the inlet-side refrigerant in the first coolant-refrigerant heat exchanger 13 can be enlarged to thereby improve a coefficient of performance of the cycle (i.e., COP).

Figure 20:
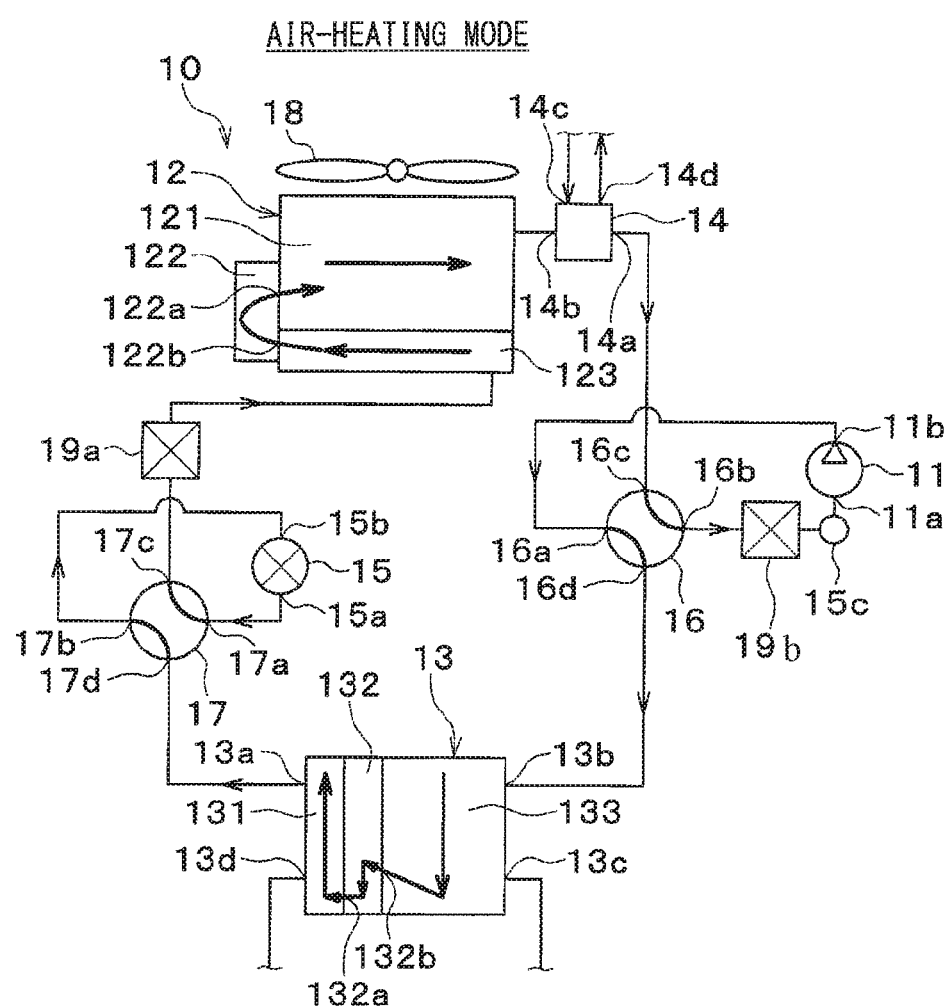
FIG. 20 is an entire configuration diagram of the refrigeration cycle device in the sixth embodiment, while showing an air-heating mode.

As shown in FIG. 20, when the air-conditioning mode is the air-heating mode, the high-pressure side refrigerant that has heat exchanged in the first coolant-refrigerant heat exchanger 13 flows through the high-pressure side refrigerant passage 19a, and the low-pressure side refrigerant that has heat exchanged in the air-refrigerant heat exchanger 12 flows through the low-pressure side refrigerant passage 19b.

The amount of the refrigerant required for the air-heating mode becomes less than the amount of the refrigerant required for the air-cooling mode. In the air-heating mode, an excess refrigerant needs to be stored in the gas-liquid separating portion 132 of the first coolant-refrigerant heat exchanger 13.

In the air-heating mode of this embodiment, the liquid-rich low-pressure side refrigerant can be stored in the low-pressure side refrigerant passage 19b, thereby reducing the capacity of the gas-liquid separating portion 132 in the first coolant-refrigerant heat exchanger 13.

In this embodiment, the high-pressure side refrigerant passage 19a in the internal heat exchanger is disposed between the air-refrigerant heat exchanger 12 and the expansion-valve refrigerant flow switching valve 17.

Thus, in the coolant-cooling mode, the heat exchange can be performed between the refrigerant having heat exchanged in the air-refrigerant heat exchanger 12 and the refrigerant having heat exchanged in the first coolant-refrigerant heat exchanger 13, thereby improving the cycle efficiency.

In the coolant-heating mode, the high-pressure side refrigerant flow path 19a is disposed in a liquid-rich region between the expansion valve 15 and the air-refrigerant heat exchanger 12. Thus, an excess refrigerant in the coolant-heating mode can be stored in the high-pressure side refrigerant flow path 19a. Consequently, the capacity of the gas-liquid separating portion 132 in the first coolant-refrigerant heat exchanger 13 can be reduced.

Seventh Embodiment

Figure 21:
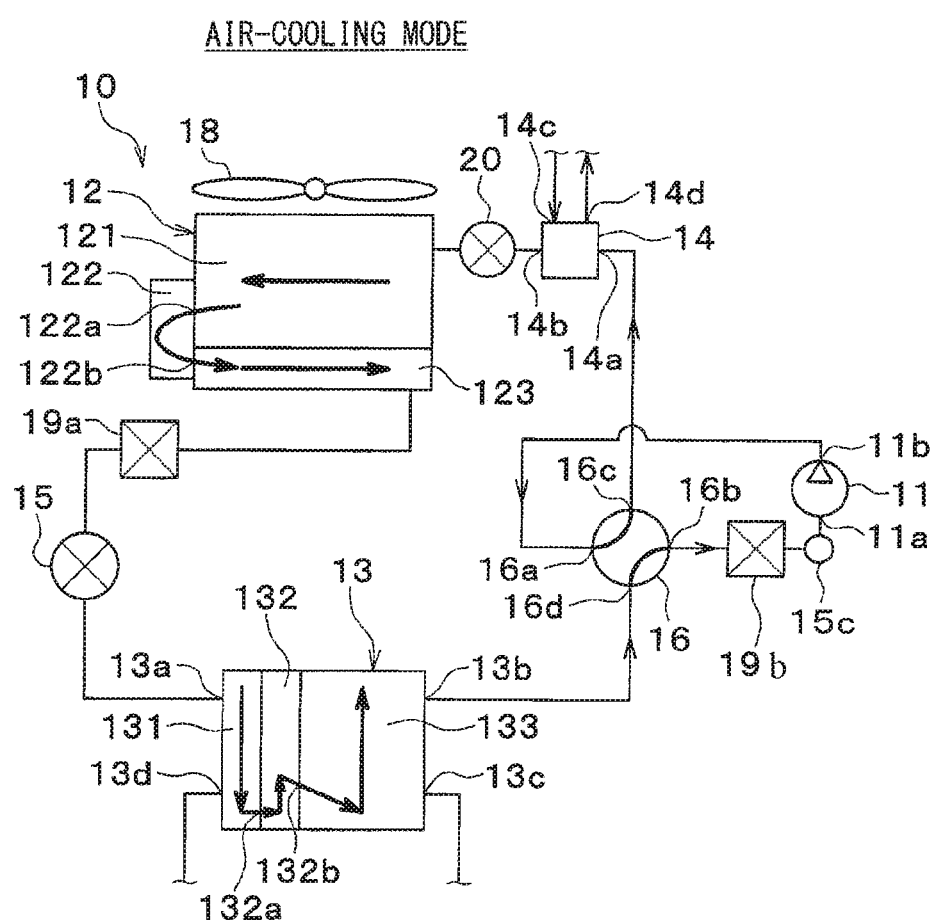
FIG. 21 is an entire configuration diagram of a refrigeration cycle device in a seventh embodiment, while showing an air-cooling mode.
Figure 22:
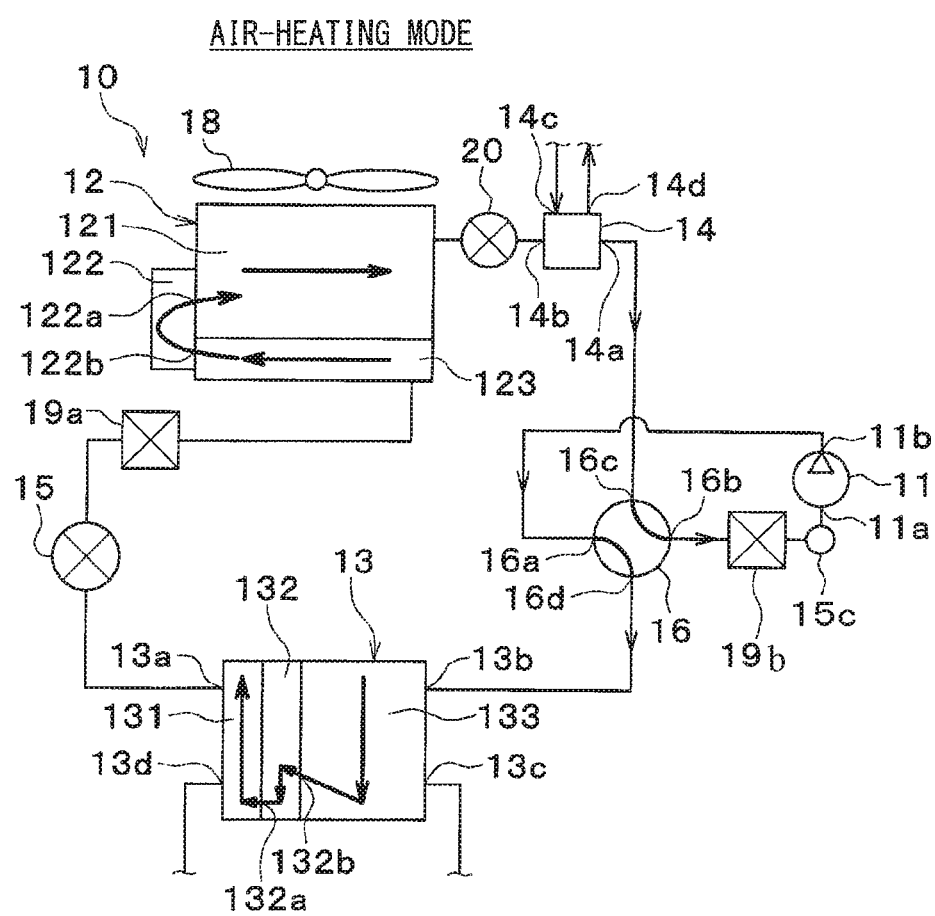
FIG. 22 is an entire configuration diagram of the refrigeration cycle device in the seventh embodiment, while showing an air-heating mode.

As shown in FIGS. 21 and 22, in this embodiment, a variable throttle 20 is added to the structure of the fourth embodiment mentioned above.

The variable throttle 20 is disposed between the second coolant-refrigerant heat exchanger 14 and the air-refrigerant heat exchanger 12. The variable throttle 20 has a valve body and an electric actuator. The valve body is configured to be capable of changing a throttle opening. The variable throttle 20 is configured to be capable of fully opening the throttle opening. The electric actuator changes the throttle opening by displacing the valve body. The operation of the electric actuator of the variable throttle 20 is controlled by the controller 40.

Such an arrangement can achieve an operation mode in which the refrigerant pressure in the second coolant-refrigerant heat exchanger 14 differs from the refrigerant pressure in the air-refrigerant heat exchanger 12.

For example, in an air-cooling mode shown in FIG. 21, the variable throttle 20 is brought into a throttled state, thereby decompressing the refrigerant having flowed out of the air-refrigerant heat exchanger 12 to an intermediate-pressure in the variable throttle 20.

Thus, the temperature of the refrigerant flowing into the air-refrigerant heat exchanger 12 can be decreased, thereby reducing a difference between the outside air temperature and the temperature of the refrigerant in the air-refrigerant heat exchanger 12, resulting in a reduced amount of heat dissipated from the refrigerant in the air-refrigerant heat exchanger 12.

Consequently, the amount of heat dissipated from the refrigerant in the second coolant-refrigerant heat exchanger 14 is increased without increasing the flow rate of the refrigerant circulating through the cycle, resulting in an increase in the temperature of the coolant heated by the second coolant-refrigerant heat exchanger 14. Further, the temperature of air to be blown from the heater core 24 can be raised.

The variable throttle 20 is further throttled, thereby more decreasing the temperature of the refrigerant flowing into the air-refrigerant heat exchanger 12, so that the air-refrigerant heat exchanger 12 can function as the evaporator. That is, the air-refrigerant heat exchanger 12 can absorb heat in the refrigerant.

Consequently, the amount of heat dissipated from the refrigerant in the second coolant-refrigerant heat exchanger 14 is further increased without increasing the flow rate of the refrigerant circulating through the cycle, thus further raising the temperature of the coolant heated by the second coolant-refrigerant heat exchanger 14. Furthermore, the temperature of air to be blown from the heater core 24 can be raised.

In this embodiment, the variable throttle 20 brings the refrigerant flow path, located between the air-refrigerant heat exchanger 12 and the second coolant-refrigerant heat exchanger 14, into either the fully opened state or the throttled state.

Thus, the refrigerant pressure in the second coolant-refrigerant heat exchanger 14 can be set to be different from the refrigerant pressure in the air-refrigerant heat exchanger 12, and thereby the amount of heat dissipated from the refrigerant in the second coolant-refrigerant heat exchanger 14 can be changed in the coolant-heating mode, further changing the amount of hot heat usable by the heater core 24.

Eighth Embodiment

Figure 23:
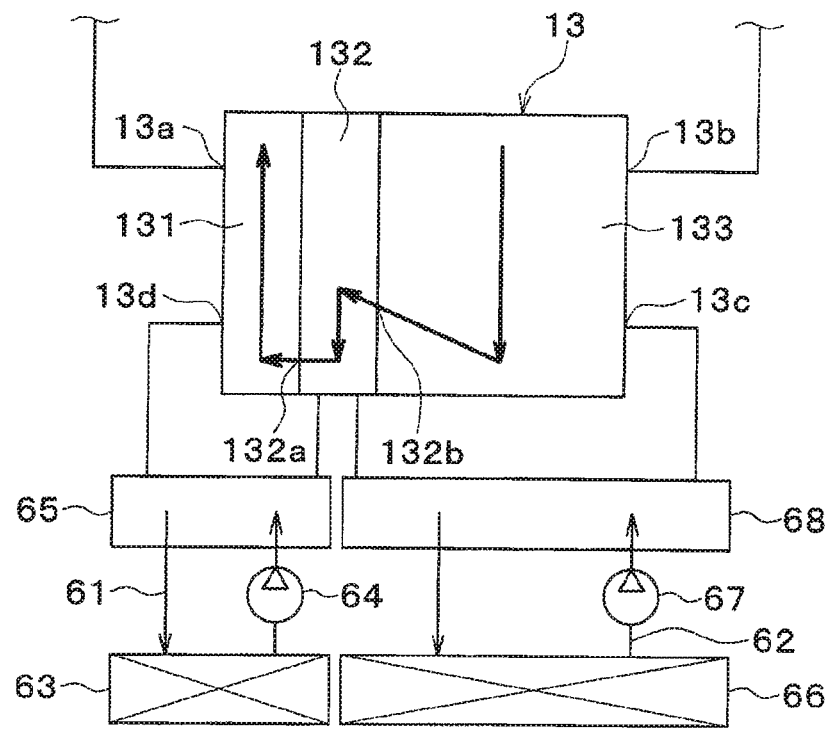
FIG. 23 is a configuration diagram showing a coolant circuit of the refrigeration cycle device in an eighth embodiment.

In the above-mentioned embodiment, when the air-conditioning mode is the air-heating mode, the coolant having heat exchanged in the heater core 24 circulates through both the first coolant-refrigerant heat exchanging portion 131 and the second coolant-refrigerant heat exchanging portion 133 of the first coolant-refrigerant heat exchanger 13. In this embodiment, as shown in FIG. 23, the coolant in a first coolant circuit 61 circulates through the first coolant-refrigerant heat exchanging portion 131 of the first coolant-refrigerant heat exchanger 13, while the coolant in a second coolant circuit 62 circulates through the second coolant-refrigerant heat exchanging portion 133 of the first coolant-refrigerant heat exchanger 13.

The first coolant circuit 61 has a first device 63, a first-device pump 64, and a first-device switching valve 65. The first coolant circuit 61 is a first heat-medium circuit through which the heat medium circulates.

The first device 63 is a device that supplies the cold heat to the coolant in the first coolant circuit 61 when the air-conditioning mode is the air-heating mode. The first-device pump 64 draws and discharges the coolant in the first coolant circuit 61. The first-device switching valve 65 opens and closes the coolant flow path in the first coolant circuit 61. The operation of the first-device switching valve 65 is controlled by the controller 40.

The second coolant circuit 62 has a second device 66, a second-device pump 67, and a second-device switching valve 68. The second coolant circuit 62 is a second heat-medium circuit through which the heat medium circulates.

The second device 66 is a device that supplies the cold heat to the coolant in the first coolant circuit 61 when the air-conditioning mode is the air-heating mode. The second-device pump 67 draws and discharges the coolant in the second coolant circuit 62. The second-device switching valve 68 opens and closes the coolant flow path in the second coolant circuit 62. The operation of the second-device switching valve 68 is controlled by the controller 40.

When the air-conditioning mode is the air-heating mode, the first device 63 cools the coolant in the first coolant circuit 61 to a lower temperature than the coolant in the second coolant circuit 62, cooled by the second device 66.

Thus, the temperature of the coolant supplied to the first coolant-refrigerant heat exchanging portion 131 in the first coolant-refrigerant heat exchanger 13 is lower than that of the coolant supplied to the second coolant-refrigerant heat exchanging portion 133, so that the subcooling degree of the refrigerant can be further enhanced by the first coolant-refrigerant heat exchanging portion 131.

In this embodiment, the first coolant circuit 61 causes the coolant to circulate through one of the first air-refrigerant heat exchanging portion 121 and the second air-refrigerant heat exchanging portion 123 in the first coolant-refrigerant heat exchanger 13. The second coolant circuit 62 causes the coolant to circulate through the other heat exchanging portion.

Thus, the temperature of the coolant circulating through the first air-refrigerant heat exchanging portion 121 can differ from the temperature of the coolant circulating through the second air-refrigerant heat exchanging portion 123, thereby improving the refrigeration cycle efficiency.

Ninth Embodiment

Figure 24:
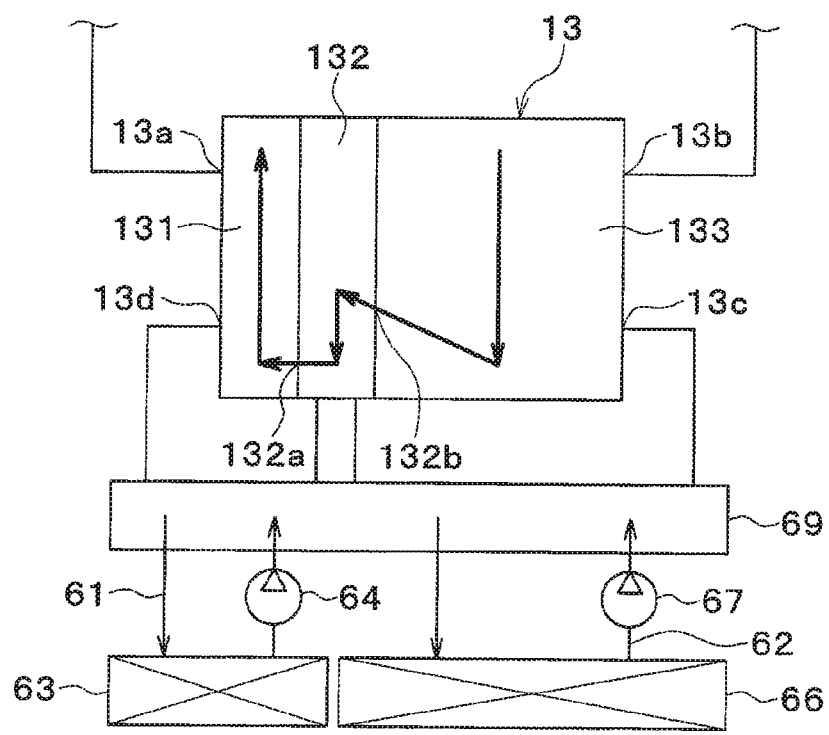
FIG. 24 is a configuration diagram showing a coolant circuit of the refrigeration cycle device in a ninth embodiment.

In the above-mentioned eighth embodiment, the respective coolants in the different coolant circuits 61 and 62 circulate through the first coolant-refrigerant heat exchanging portion 131 and the second coolant-refrigerant heat exchanging portion 133 in the first coolant-refrigerant heat exchanger 13, respectively. Meanwhile, as shown in FIG. 24, this embodiment is capable of switching between a state in which the coolants in the different coolant circuits 61 and 62 circulate through the first coolant-refrigerant heat exchanging portion 131 and the second coolant-refrigerant heat exchanging portion 133 in the first coolant-refrigerant heat exchanger 13, respectively, and a state in which these first and second coolant-refrigerant heat exchanging portions allow the coolant in the same coolant circuit to circulate therethrough.

The first coolant-refrigerant heat exchanging portion 131 and the second coolant-refrigerant heat exchanging portion 133 in the first coolant-refrigerant heat exchanger 13 are connected to the first coolant circuit 61 and the second coolant circuit 62, respectively, via a coolant-circuit switching valve 69.

The coolant-circuit switching valve 69 is a heat-medium circuit switching valve that switches between a state of connection to the first coolant circuit 61 and a state of connection to the second coolant circuit 62 with respect to each of the first coolant-refrigerant heat exchanging portion 131 and the second coolant-refrigerant heat exchanging portion 133 in the first coolant-refrigerant heat exchanger 13. The operation of the coolant-circuit switching valve 69 is controlled by the controller 40.

The coolant-circuit switching valve 69 switches between two states below. In one state, the first coolant-refrigerant heat exchanging portion 131 of the first coolant-refrigerant heat exchanger 13 is connected to one of the first and second coolant circuits 61 and 62, and the second coolant-refrigerant heat exchanging portion 133 of the first coolant-refrigerant heat exchanger 13 is connected to the other of the first and second coolant circuits 61 and 62. In the other state, both the first coolant-refrigerant heat exchanging portion 131 and the second coolant-refrigerant heat exchanging portion 133 in the first coolant-refrigerant heat exchanger 13 are connected to one of the first and second coolant circuits 61 and 62.

Thus, the temperature of the coolant circulating through the first coolant-refrigerant heat exchanging portion 131 can be adjusted to thereby regulate the subcooling degree of the refrigerant subcooled in the first coolant-refrigerant heat exchanging portion 131.

In this embodiment, the coolant-circuit switching valve 69 switches to the state in which both the first coolant-refrigerant heat exchanging portion 131 and the second coolant-refrigerant heat exchanging portion 133 in the first coolant-refrigerant heat exchanger 13 are connected to one of the first and second coolant circuits 61 and 62.

Thus, the temperature of the coolant circulating through the first coolant-refrigerant heat exchanging portion 131 and the temperature of the coolant circulating through the second coolant-refrigerant heat exchanging portion 133 can change depending on the situation, thereby improving the refrigeration cycle efficiency.

Tenth Embodiment

Figure 25:
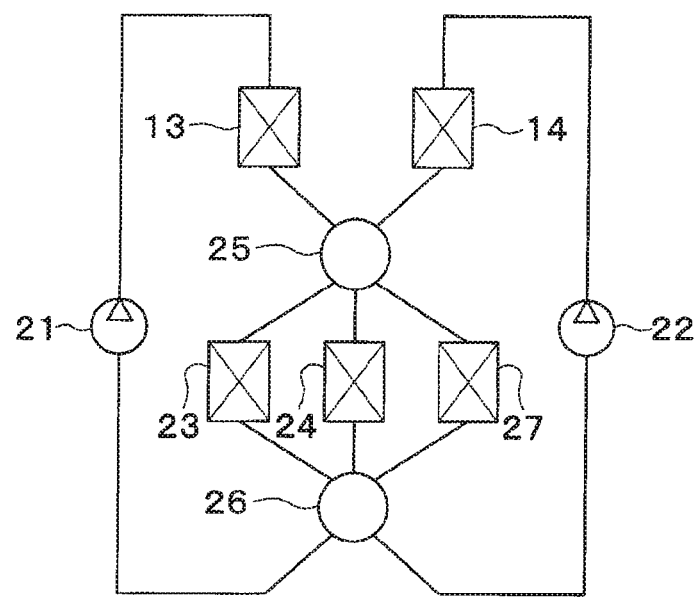
FIG. 25 is a configuration diagram showing a coolant circuit of the refrigeration cycle device in a tenth embodiment.

In the above-mentioned first embodiment, the upstream-side coolant flow switching valve 25 and the downstream-side coolant flow switching valve 26 selectively connect each of the first and second coolant-refrigerant heat exchangers 13 and 14 to one of the cooler core 23 and the heater core 24. Meanwhile, in this embodiment, as shown in FIG. 25, the upstream-side coolant flow switching valve 25 and the downstream-side coolant flow switching valve 26 selectively connect each of the first and second coolant-refrigerant heat exchangers 13 and 14 to any one of the cooler core 23, the heater core 24, and a vehicle-mounted device 27.

The vehicle-mounted device 27 is a heat-source device that supplies hot heat to the coolant. The heat-source device serves as a heat generating device that generates heat during operation. The vehicle-mounted device 27 is a coolant-circulation device through which the coolant circulates. The vehicle-mounted device 27 serves as a heat-medium flowing device through which a heat medium is capable of circulating.

Examples of the vehicle-mounted device 27 include a battery pack, an inverter, a DC-DC converter, a water-cooled intercooler, an engine, and an oil cooler. A number of vehicle-mounted device 27 may be disposed between the upstream-side coolant flow switching valve 25 and the downstream-side coolant flow switching valve 26.

As mentioned in the first embodiment, when frost formation occurs at the air-refrigerant heat exchanger 12 in the air-heating mode, the air-refrigerant heat exchanger 12 is defrosted by switching the air-conditioning mode to the air-cooling mode.

At this time, the upstream-side coolant flow switching valve 25 and the downstream-side coolant flow switching valve 26 connect between the first coolant-refrigerant heat exchanger 13 and the vehicle-mounted device 27. Thus, the frost adhering to the air-refrigerant heat exchanger 12 can be melted by using heat supplied from the vehicle-mounted device 27.

When the air-refrigerant heat exchanger 12 needs to be defrosted, for example, during parking or charging of a battery, or while an air inflow portion of the air-refrigerant heat exchanger 12 is closed by a shutter, the upstream-side and downstream-side coolant flow switching valves 25 and 26 may connect the first coolant-refrigerant heat exchanger 13 to the vehicle-mounted device 27 as long as the air speed of air flowing into the air-refrigerant heat exchanger 12 is 1 m/s or lower.

With this arrangement, when air-heating is not required, or when there is no problem even though the vehicle-mounted device 27 is cooled, the heat supplied from the vehicle-mounted device 27 is used to defrost the air-refrigerant heat exchanger 12, thereby making it possible to prevent the defrosting from interfering with air-heating or traveling.

In this embodiment, the first-device switching valve 25, the second-device switching valve 26, and the controller 40 serve as the heat-medium circulation device that causes the coolant to circulate between the first coolant-refrigerant heat exchanger 13 and a coolant-circulation device 72, when frost adhering to the air-refrigerant heat exchanger 12 needs to be melted.

Thus, the frost adhering to the air-refrigerant heat exchanger 12 can be melted by using heat of the coolant-circulation device 72.

Eleventh Embodiment

Figure 26:
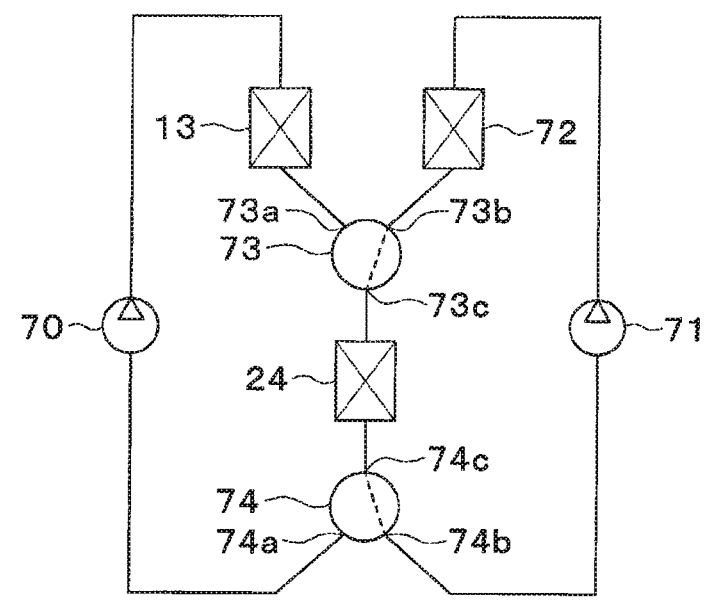
FIG. 26 is a configuration diagram showing a coolant circuit of the refrigeration cycle device in an eleventh embodiment.

As shown in FIG. 26, this embodiment switches between a state in which the coolant flowing through the first coolant-refrigerant heat exchanger 13 circulates through the heater core 24 and a state in which the coolant bypassing the first coolant-refrigerant heat exchanger 13 circulates through the heater core 24.

The refrigeration cycle device 10 includes a first coolant pump 70, a second coolant pump 71, a heat-source device 72, an upstream-side coolant flow switching valve 73, and a downstream-side coolant flow switching valve 74.

The first coolant pump 70 is an electric pump that draws and discharges the coolant circulating through the first coolant-refrigerant heat exchanger 13. A coolant discharge side of the first coolant pump 70 is connected to a coolant inlet side of the first coolant-refrigerant heat exchanger 13.

The second coolant pump 71 is an electric pump that draws and discharges the coolant (heat medium) circulating through the heat-source device 72. A coolant discharge side of the second coolant pump 71 is connected to a coolant inlet side of the heat-source device 72.

The heat-source device 72 is a device that supplies hot heat to the coolant. The heat-source device 72 serves as a device that generates heat during operation. For example, the heat-source device 72 is an engine or an exhaust heat recovery device. The exhaust heat recovery device is a heat exchanger that recovers heat from exhaust air of the engine.

The upstream-side coolant flow switching valve 73 and the downstream-side coolant flow switching valve 74 are coolant flow switching devices that switch the state of the coolant flow.

The upstream-side coolant flow switching valve 73 includes a first coolant inflow port 73a and a second coolant inflow port 73b, from both of which the coolant flows into the upstream-side coolant flow switching valve 73, and a coolant outflow port 73c, through which the coolant flows out of the upstream-side coolant flow switching valve 73.

The first coolant inflow port 73a is connected to a coolant outlet side of the first coolant-refrigerant heat exchanger 13. The second coolant inflow port 73b is connected to a coolant outlet side of the heat-source device 72. The coolant outflow port 73c is connected to a coolant inlet side of the heater core 24.

The upstream-side coolant flow switching valve 73 switches between a state in which the first coolant inflow port 73a is connected to the coolant outflow port 73c and a state in which the second coolant inflow port 73b is connected to the coolant outflow port 73c.

The downstream-side coolant flow switching valve 74 includes a coolant inflow port 74a, from which the coolant flows into the downstream-side coolant flow switching valve 74, and a first coolant outflow port 74b and a second coolant outflow port 74c, through both of which the coolant flows out of the downstream-side coolant flow switching valve 74.

The coolant inflow port 74a is connected to a coolant outlet side of the heater core 24. The first coolant outflow port 74b is connected to a coolant suction side of the first coolant pump 70. The second coolant outflow port 74c is connected to a coolant suction side of the second coolant pump 71.

The downstream-side coolant flow switching valve 74 switches between a state in which the coolant inflow port 74a is connected to the first coolant outflow port 74b and a state in which the coolant inflow port 74a is connected to the second coolant outflow port 74c.

The operations of the upstream-side coolant flow switching valve 73 and the downstream-side coolant flow switching valve 74 are controlled by the controller 40.

When the air-conditioning mode is the air-heating mode, the upstream-side coolant flow switching valve 73 connects between the first coolant inflow port 73a and the coolant outflow port 73c. Thus, the coolant heated in the first coolant-refrigerant heat exchanger 13 circulates through the heater core 24, thereby enabling air-heating of the vehicle interior.

As mentioned in the first embodiment, when frost formation occurs at the air-refrigerant heat exchanger 12 in the air-heating mode, the air-refrigerant heat exchanger 12 is defrosted by switching the air-conditioning mode to the air-cooling mode.

At this time, the upstream-side coolant flow switching valve 73 connects between the second coolant inflow port 73b and the coolant outflow port 73c. In this way, the coolant bypassing the first coolant-refrigerant heat exchanger 13 circulates through the heater core 24. Thus, the coolant can be avoided from absorbing heat from the air in the heater core 24, and concurrently the air can be heated in the heater core 24 using the thermal capacity of the coolant and heat supplied from the heat-source device 72. Therefore, the air-heating of the vehicle interior can be continued while defrosting the air-refrigerant heat exchanger 12.

In this embodiment, the upstream-side coolant flow switching valve 73, the downstream-side coolant flow switching valve 74, and the controller 40 serve as a bypass switching device that switches the flow of the coolant such that the coolant circulating through the heater core 24 bypasses the first coolant-refrigerant heat exchanger 13 when the frost adhering to the air-refrigerant heat exchanger 12 needs to be melted.

Thus, the coolant bypassing the first coolant-refrigerant heat exchanger 13 can circulate through the heater core 24 when melting the frost adhering to the air-refrigerant heat exchanger 12. Consequently, the heater core 24 can use the hot heat of the coolant while melting the frost adhering to the air-refrigerant heat exchanger 12.

Twelfth Embodiment

In the above-mentioned embodiment, the first coolant-refrigerant heat exchanger 13 and the second coolant-refrigerant heat exchanger 14 are switchably connected to the cooler core 23 and the heater core 24. In this embodiment, as shown in FIGS. 27 and 28, the coolant circulates between the first coolant-refrigerant heat exchanger 13 and a first temperature-adjustment target device 81, while the coolant circulates between the second coolant-refrigerant heat exchanger 14 and a second temperature-adjustment target device 82.

The first temperature-adjustment target device 81 and the second temperature-adjustment target device 82 are devices having the temperature thereof adjusted by the coolant. Each of the first temperature-adjustment target device 81 and the second temperature-adjustment target device 82 is, for example, an air-conditioning heat exchanger, a power-train device, etc.

The air-conditioning heat exchanger is a coolant-air heat exchanger that exchanges heat between the coolant and the air to be blown into the vehicle interior. The power-train device is a vehicle-mounted device in which an operating temperature must be adjusted within a predetermined range. The power-train device is a battery or the like.

Figure 27:
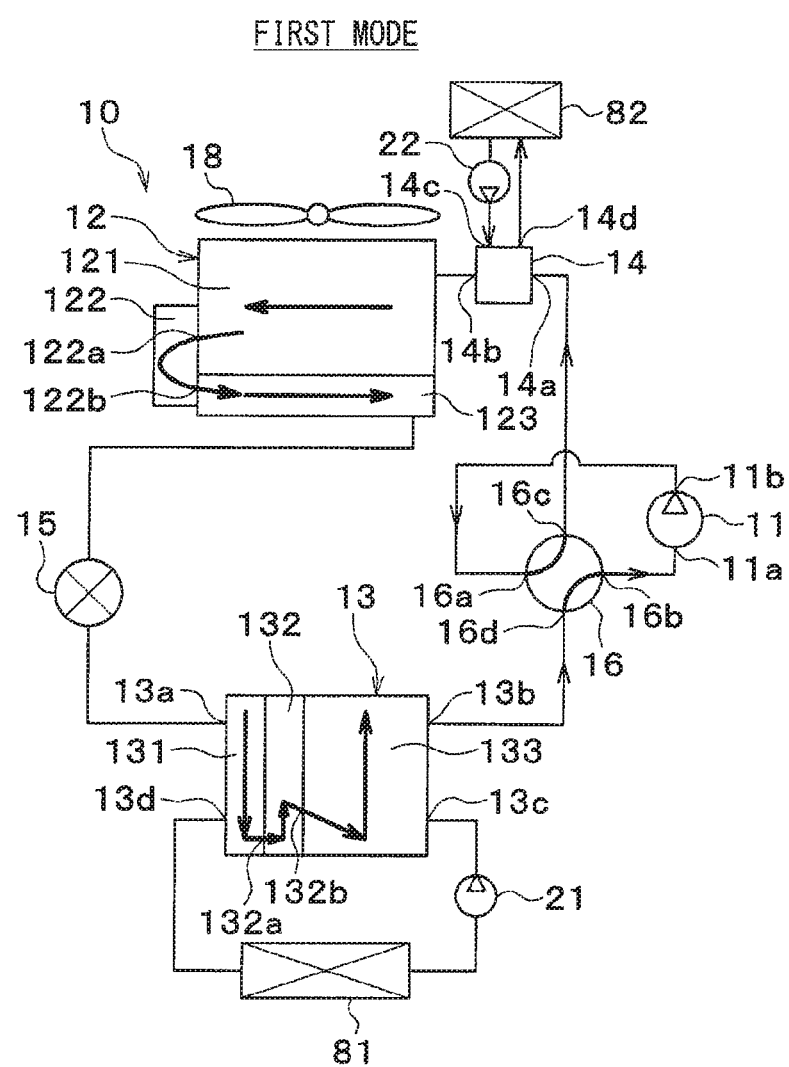
FIG. 27 is an entire configuration diagram of a refrigeration cycle device in a twelfth embodiment, while showing a first mode.
Figure 28:
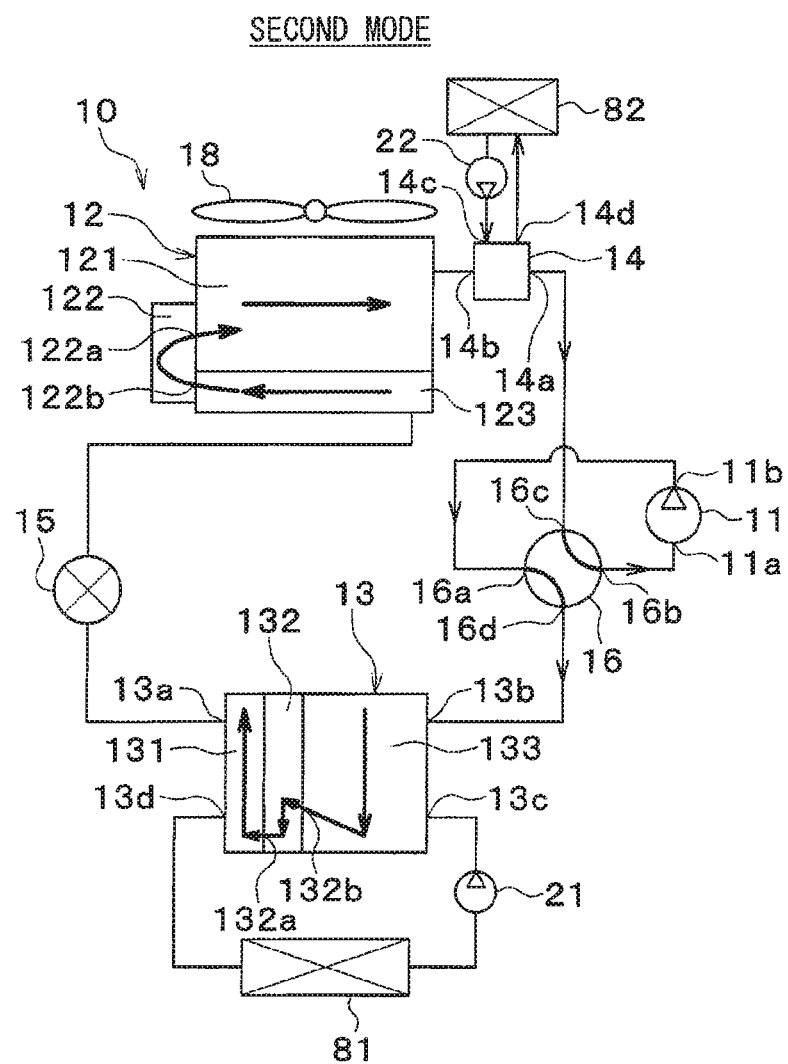
FIG. 28 is an entire configuration diagram of the refrigeration cycle device in the twelfth embodiment, while showing a second mode.

The refrigerant flow switching valve 16 switches between a refrigerant-flow state in a first mode shown in FIG. 27 and a refrigerant-flow state in a second mode shown in FIG. 28.

The first mode is a coolant-cooling mode in which the refrigerant circulates through the compressor 11, the second coolant-refrigerant heat exchanger 14, the air-refrigerant heat exchanger 12, the expansion valve 15, the first coolant-refrigerant heat exchanger 13, and the compressor 11 in this order, thereby cooling the coolant in the first coolant-refrigerant heat exchanger 13.

The second mode is a coolant-heating mode in which the refrigerant circulates through the compressor 11, the first coolant-refrigerant heat exchanger 13, the expansion valve 15, the air-refrigerant heat exchanger 12, the second coolant-refrigerant heat exchanger 14, and the compressor 11 in this order, thereby heating the coolant in the coolant-refrigerant heat exchanger 13.

In the first mode shown in FIG. 27, the coolant is cooled in the first coolant-refrigerant heat exchanger 13, while the coolant is heated in the second coolant-refrigerant heat exchanger 14, thereby decreasing the temperature of the first temperature-adjustment target device 81 and increasing the temperature of the second temperature-adjustment target device 82.

In the second mode shown in FIG. 28, the coolant is heated in the first coolant-refrigerant heat exchanger 13, while the coolant is cooled in the second coolant-refrigerant heat exchanger 14, thereby increasing the temperature of the first temperature-adjustment target device 81 and decreasing the temperature of the second temperature-adjustment target device 82.

In this embodiment, the first temperature-adjustment target device 81 has its temperature adjusted by the coolant, which has heat exchanged in the first coolant-refrigerant heat exchanger 13. The refrigerant flow switching valve 16 switches between the first mode and the second mode. In the first mode, the coolant is cooled in the coolant-refrigerant heat exchanger 13. In the second mode, the coolant is heated in the coolant-refrigerant heat exchanger 13.

Thus, the refrigerant flow switching valve 16 switches between the first mode and the second mode, thereby changing the temperature of the coolant flowing through the first temperature-adjustment target device 81, so that the first temperature-adjustment target device 81 can be cooled or heated.

Because of this, the temperature of the first temperature-adjustment target device 81 can be adjusted without switching the flow of the coolant. Therefore, the configuration of the coolant circuit can be simplified. Furthermore, the temperature of the first temperature-adjustment target device 81 can be adjusted without providing, in the coolant circuit, a switching valve required for high thermal insulation properties and low leakage.

Specifically, in the first mode, the refrigerant circulates through the compressor 11, the second coolant-refrigerant heat exchanger 14, the air-refrigerant heat exchanger 12, the expansion valve 15, the first coolant-refrigerant heat exchanger 13, and the compressor 11 in this order. Meanwhile, in the second mode, the refrigerant circulates through the compressor 11, the first coolant-refrigerant heat exchanger 13, the expansion valve 15, the air-refrigerant heat exchanger 12, the second coolant-refrigerant heat exchanger 14, and the compressor 11 in this order.

Thus, in the first mode, the first temperature-adjustment target device 81 is cooled, and in the second mode, the first temperature-adjustment target device 81 is heated.

In this embodiment, the first temperature-adjustment target device 81 is at least one of a coolant-air heat exchanger and a vehicle-mounted device. The coolant-air heat exchanger exchanges heat between the coolant having heat exchanged in the coolant-refrigerant heat exchanger 13 and the air to be blown into a space to be air-conditioned. The vehicle-mounted device is required to be within a predetermined range of temperatures.

In this way, at least one of the air-conditioning of the vehicle interior and the temperature adjustment of the vehicle-mounted device can be performed.

Thirteenth Embodiment

Figure 29:
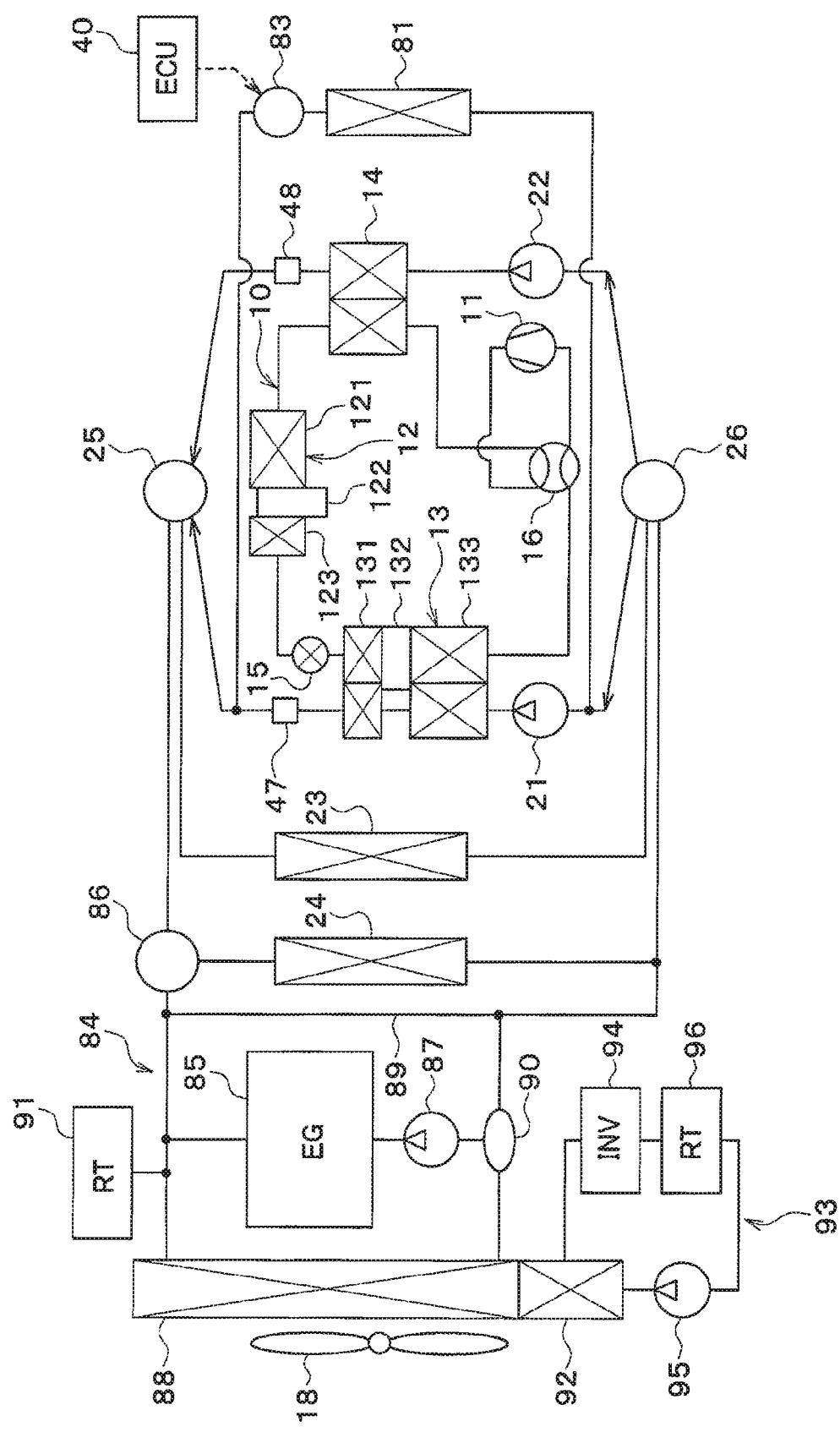
FIG. 29 is an entire configuration diagram of a refrigeration cycle device in a thirteenth embodiment.

In the above-mentioned twelfth embodiment, the coolant flowing out of the first coolant-refrigerant heat exchanger 13 flows through the first temperature-adjustment target device 81, and then into the first coolant-refrigerant heat exchanger 13. As shown in FIG. 29, in this embodiment, the coolant flowing out of the first coolant-refrigerant heat exchanger 13 is branched into a side of the upstream-side coolant flow switching valve 25 and a side of the first temperature-adjustment target device 81. Further, the coolant flowing out of the downstream-side coolant flow switching valve 26 and the coolant flowing out of the side of the first temperature-adjustment target device 81 are merged together to flow into the first coolant-refrigerant heat exchanger 13.

A flow-rate adjustment valve 83 is disposed on a coolant inlet side of the first temperature-adjustment target device 81 so as to adjust the flow rate of the coolant flowing into the first temperature-adjustment target device 81. The flow-rate adjustment valve 83 is, for example, an on/off valve that opens and closes the coolant flow path. The flow-rate adjustment valve 83 is an intermittent portion that intermittently connects the flow of the coolant to the first temperature-adjustment target device 81. The operation of the flow-rate adjustment valve 83 is controlled by the controller 40.

The heater core 24 is connected to an engine coolant circuit 84. The engine coolant circuit 84 is a coolant circuit through which the coolant for cooling an engine 85 circulates.

A three-way valve 86 is disposed in a connection portion between the heater core 24 and the engine coolant circuit 84. The three-way valve 86 is a coolant flow switching valve that switches among the following states: a state in which the heater core 24 communicates with the upstream-side coolant flow switching valve 25; a state in which the heater core 24 communicates with the engine coolant circuit 84; a state in which the heater core 24 communicates with both the upstream-side coolant flow switching valve 25 and the engine coolant circuit 84; and a state in which the connection between the heater core 24 and each of both the upstream-side coolant flow switching valve 25 and the engine coolant circuit 84 is interrupted. The three-way valve 86 serves as a flow-rate adjustment valve that adjusts the flow rate of the coolant in each communication state. The operation of the three-way valve 86 is controlled by the controller 40.

The engine coolant circuit 84 includes an engine pump 87, an engine radiator 88, a radiator bypass flow path 89, a thermostat 90, and a first reserve tank 91.

The engine pump 87 is a pump that draws and discharges the coolant circulating through the engine coolant circuit 84. The engine pump 87 is a belt-driven pump that is driven by the driving force of the engine 85 transferred thereto via an engine belt. The engine pump 87 may be an electric pump.

The engine radiator 88 is a heat exchanger that exchanges heat between the outside air and the coolant in the engine coolant circuit 84. The engine radiator 88 is disposed at the forefront of the vehicle, together with the air-refrigerant heat exchanger 12. The engine radiator 88 and the air-refrigerant heat exchanger 12 receive the outside air blown by the exterior blower 18. During traveling of the vehicle, traveling air can hit the engine radiator 88 and the air-refrigerant heat exchanger 12.

The radiator bypass flow path 89 is a coolant flow path through which the coolant flowing out of the engine 85 flows while bypassing the engine radiator 88.

The thermostat 90 is a coolant temperature responsive valve. The coolant temperature responsive valve is a valve that includes a mechanical mechanism designed to open and close a coolant flow path by displacing a valve body using a thermo wax that has its volume changeable depending on its temperature.

When the temperature of the coolant in the engine coolant circuit 84 is below a predetermined temperature (e.g., 70° C.), the thermostat 90 closes the coolant flow path on a side of the engine radiator 88 to interrupt the flow of the coolant to the engine radiator 88.

The first reserve tank 91 serves as a coolant storage portion that stores therein excess coolant, and as a pressure adjusting portion that adjusts the pressure in the coolant circuit within an appropriate range. The first reverse tank 91 also serves as a gas-liquid separating portion that separates air bubbles contained in the coolant, into gas and liquid.

The engine radiator 88 is integral with an inverter radiator 92. The inverter radiator 92 is a heat exchanger that exchanges heat between the outside air and the coolant in the inverter cooling circuit 93. The inverter cooling circuit 93 is a coolant circuit through which the coolant for cooling the inverter 94 circulates.

The inverter cooling circuit 93 has an inverter pump 95 and a second reserve tank 96. The inverter pump 95 is a pump that draws and discharges the coolant circulating through the inverter cooling circuit 93. The inverter pump 95 is a belt-driven pump that is driven by the driving force of the engine 85 transferred thereto via an engine belt. The inverter pump 95 may be an electric pump.

The second reserve tank 96 serves as a coolant storage portion that stores therein excess coolant and as a pressure adjusting portion that adjusts the pressure in the coolant circuit within an appropriate range. The second reverse tank 96 also serves as a gas-liquid separating portion that separates air bubbles contained in the coolant, into gas and liquid.

Next, the operation of the above-mentioned structure will be described. The controller 40 controls the operations of the flow-rate adjustment valve 83 and the refrigerant flow switching valve 16 in accordance with the temperature of the first temperature-adjustment target device 81. When the flow-rate adjustment valve 83 is opened, the coolant flowing out of the first coolant-refrigerant heat exchanger 13 flows into the first temperature-adjustment target device 81.

When switched to the first mode by the refrigerant flow switching valve 16, the coolant is cooled by the first coolant-refrigerant heat exchanger 13, thus decreasing the temperature of the first temperature-adjustment target device 81. When switched to the second mode by the refrigerant flow switching valve 16, the coolant is heated by the first coolant-refrigerant heat exchanger 13, thus raising the temperature of the first temperature-adjustment target device 81. Therefore, the temperature of the first temperature-adjustment target device 81 can be adjusted.

For instance, suppose that the first temperature-adjustment target device 81 needs to be adjusted within a temperature range, i.e., at a lower limit temperature or higher and an upper limit temperature or lower. In such a case, if the temperature of the first temperature-adjustment target device 81 becomes the upper limit temperature or higher, the controller 40 controls the operation of the refrigerant flow switching valve 16 to be in the first mode and also controls the operation of the flow-rate adjustment valve 83 to cause the coolant to flow to the first temperature-adjustment target device 81. If the temperature of the first temperature-adjustment target device 81 becomes the lower limit temperature or lower, the controller 40 controls the operation of the refrigerant flow switching valve 16 to be in the second mode and also controls the operation of the flow-rate adjustment valve 83 to cause the coolant to flow to the first temperature-adjustment target device 81. In this way, the first temperature-adjustment target device 81 can be adjusted within the temperature range from the lower limit temperature or higher to the upper limit temperature or lower.

The controller 40 controls the opening degree of the flow-rate adjustment valve 83, thereby adjusting the flow rate of the coolant flowing through the first temperature-adjustment target device 81. Thus, the temperature of the first temperature-adjustment target device 81 can be adjusted precisely.

In this embodiment, the flow-rate adjustment valve 83 intermittently connects the flow of the coolant to the first temperature-adjustment target device 81. Thus, the temperature of the first temperature-adjustment target device 81 can be adjusted appropriately.

In this embodiment, the controller 40 controls the operation of the flow-rate adjustment valve 83 based on the temperature of the first temperature-adjustment target device 81. Thus, the temperature of the first temperature-adjustment target device 81 can be adjusted even more appropriately.

OTHER EMBODIMENTS

The above-mentioned embodiments can be combined together, as appropriate. Various modifications and changes can be made to the above-mentioned embodiments, for example, in the following way.

(1) Although in the above-mentioned embodiments, the coolant is used as the heat medium flowing through the coolant circuit, various kinds of media, such as oil, may be used as the heat medium. The heat medium in use may be an ethylene glycol-based antifreezing fluid, water, air kept at a certain temperature or higher, or the like.

Alternatively, nanofluid may be used as the heat medium. The nanofluid is a fluid containing nanoparticles, each having a diameter of the order of nanometer. By mixing the nanoparticles into the heat medium, the following functions and effects can be obtained, in addition to the function and effect of decreasing a freezing point, like a coolant (so-called antifreezing fluid) using ethylene glycol.

That is, the mixture of the nanoparticles in the heat medium exhibits the functions and effects of improving the thermal conductivity in a specific temperature range, increasing the thermal capacity of the heat medium, preventing the corrosion of a metal pipe and the degradation of a rubber pipe, and enhancing the fluidity of the heat medium at an ultralow temperature.

These functions and effects are varied depending on the configuration, shape, and blending ratio of the nanoparticles, and additive material.

Thus, the mixture of the nanoparticles in the heat medium can improve its thermal conductivity, and thus even in a small amount, can exhibit the substantially same cooling efficiency as that of the coolant using ethylene glycol.

Further, such a heat medium can also increase its thermal capacity and thereby can increase a cold storage amount (cold storage of the sensible heat) of the heat medium itself.

By increasing the cold storage amount, the temperature adjustment, including cooling and heating, of the device using the cold storage can be performed for some period of time even though the compressor 11 is not operated, which can save the power of the refrigeration cycle device 10.

An aspect ratio of the nanoparticle is preferably 50 or more. This is because such an aspect ratio can obtain the adequate thermal conductivity. Note that the aspect ratio of the nanoparticle is a shape index that indicates the ratio of the width to the height of the nanoparticle.

Nanoparticles suitable for use can include any one of Au, Ag, Cu, and C. Specifically, examples of atoms configuring the nanoparticles in use can include Au nanoparticles, a Ag nanowire, a carbon nanotube (CNT), a graphene, a graphite core-shell nanoparticle (a particle body with the above-mentioned atom surrounded by a structure, such as a carbon nanotube), an Au nanoparticle-containing CNT, and the like.

(2) In the vapor compression refrigerator of the above-mentioned embodiments, fluorocarbon refrigerant is used as the refrigerant. However, the kind of refrigerant is not limited thereto, and may be natural refrigerant, such as carbon dioxide, a hydrocarbon refrigerant, and the like.

The vapor compression refrigerator in the above-mentioned embodiments constitutes a subcritical refrigeration cycle in which a high-pressure side refrigerant pressure does not exceed the critical pressure of the refrigerant, but may constitute a super-critical refrigeration cycle in which a high-pressure side refrigerant pressure exceeds the critical pressure of the refrigerant.

(3) In the above-mentioned embodiments, the refrigeration cycle device 10 is applied to a hybrid vehicle by way of example, but may be applied to an electric vehicle or the like that is not equipped with the engine and obtains a traveling driving force from a traveling electric motor.

(4) In the above-mentioned embodiments, the refrigeration cycle device 10 is mounted on a vehicle, but not necessarily mounted on a vehicle. That is, the refrigeration cycle device 10 may be used to adjust various devices (non-vehicle mounted devices), in addition to the vehicle-mounted devices, to an appropriate temperature.

What is claimed is:

1. A refrigeration cycle device comprising:
a compressor that draws and discharges a refrigerant;
an air-refrigerant heat exchanger that exchanges heat between air and the refrigerant;
a decompression device that decompresses the refrigerant;
a heat medium-refrigerant heat exchanger that exchanges heat between a heat medium and the refrigerant;
a cold-heat utilization device that utilizes cold heat of the heat medium;
a hot-heat utilization device that utilizes hot heat of the heat medium;

a refrigerant flow switching valve configured to switch between a heat-medium cooling mode and a heat-medium heating mode, the heat-medium cooling mode causing the refrigerant to circulate through the compressor, the air-refrigerant heat exchanger, the decompression device, the heat medium-refrigerant heat exchanger, and the compressor in sequence, to cool the heat medium in the heat medium-refrigerant heat exchanger, the heat-medium heating mode causing the refrigerant to circulate through the compressor, the heat medium-refrigerant heat exchanger, the decompression device, the air-refrigerant heat exchanger, and the compressor in sequence, to heat the heat medium in the heat medium-refrigerant heat exchanger; and a heat-medium flow switching valve configured to switch the heat medium flow to a first passage in the heat medium cooling mode, wherein through the first passage the heat medium circulates between the heat medium-refrigerant heat exchanger and the cold-heat utilization device, and to switch the heat medium flow to a second passage in the heat-medium heating mode, wherein through the second passage the heat medium circulates between the heat medium-refrigerant heat exchanger and the hot-heat utilization device.

2. The refrigeration cycle device according to claim 1, wherein the air-refrigerant heat exchanger has a first gas-liquid separating portion that separates the refrigerant into a gas-phase refrigerant and a liquid-phase refrigerant and flows out the liquid-phase refrigerant in the heat-medium cooling mode, and the heat medium-refrigerant heat exchanger has a second gas-liquid separating portion that separates the refrigerant into a gas-phase refrigerant and a liquid-phase refrigerant and flows out the liquid-phase refrigerant in the heat-medium heating mode.

3. The refrigeration cycle device according to claim 2, wherein in the heat-medium cooling mode and in the heat-medium heating mode, the refrigerant flow switching valve causes a flow direction of the refrigerant flowing through each of the air-refrigerant heat exchanger and the heat medium-refrigerant heat exchanger to be opposite.

4. The refrigeration cycle device according to claim 2, wherein the air-refrigerant heat exchanger includes a first air-refrigerant heat exchanging portion and a second air-refrigerant heat exchanging portion, which are adapted to exchange heat between the air and the refrigerant, and the first gas-liquid separating portion is disposed between the first air-refrigerant heat exchanging portion and the second air-refrigerant heat exchanging portion in a flow direction of the refrigerant.

5. The refrigeration cycle device according to claim 4, wherein in the heat-medium cooling mode, the first air-refrigerant heat exchanging portion is positioned on an upstream side of a flow of the refrigerant with respect to the second air-refrigerant heat-exchanging portion, and the first air-refrigerant heat exchanging portion and the second air-refrigerant heat exchanging portion are configured such that a heat exchanging amount of the first air-refrigerant heat exchanging portion is larger than a heat exchanging amount of the second air-refrigerant heat exchanging portion.

6. The refrigeration cycle device according to claim 2, wherein the heat medium-refrigerant heat exchanger includes a first heat medium-refrigerant heat exchanging portion and a second heat medium-refrigerant heat exchanging portion, which are adapted to exchange heat between the heat medium and the refrigerant, and the second gas-liquid separating portion is disposed between the first heat medium-refrigerant heat exchanging portion and the second heat medium-refrigerant heat exchanging portion in a flow direction of the refrigerant.

7. The refrigeration cycle device according to claim 6, wherein in the heat-medium heating mode, the second heat medium-refrigerant heat exchanging portion is positioned on an upstream side of a flow of the refrigerant with respect to the first heat medium-refrigerant heat-exchanging portion, and the first heat medium-refrigerant heat exchanging portion and the second heat medium-refrigerant heat exchanging portion are configured such that a heat exchanging amount of the second heat medium-refrigerant heat exchanging portion is larger than a heat exchanging amount of the first heat medium-refrigerant heat exchanging portion.

8. The refrigeration cycle device according to claim 1, wherein at least one of the air-refrigerant heat exchanger and the heat medium-refrigerant heat exchanger has a flow-path cross-sectional area for the refrigerant decreased from an upstream side to a downstream side in a flow direction of the refrigerant when exchanging heat with the refrigerant provided before being decompressed by the decompression device, and has the flow-path cross-sectional area for the refrigerant increased from the upstream side to the downstream side in the flow direction of the refrigerant when exchanging heat with the refrigerant provided after being decompressed by the decompression device.

9. The refrigeration cycle device according to claim 6, further comprising:

a first heat-medium circuit that causes the heat medium to circulate through one of the first heat medium-refrigerant heat exchanging portion and the second heat medium-refrigerant heat exchanging portion; and a second heat-medium circuit that causes the heat medium to circulate through the other of the first heat medium-refrigerant heat exchanging portion and the second heat medium-refrigerant heat exchanging portion.

10. The refrigeration cycle device according to claim 9, further comprising a heat-medium circuit switching valve that switches to a state in which both the first heat medium-refrigerant heat exchanging portion and the second heat medium-refrigerant heat exchanging portion are connected to one of the first heat-medium circuit and the second heat-medium circuit.

11. The refrigeration cycle device according to claim 1, wherein the heat medium-refrigerant heat exchanger includes a first heat medium-refrigerant heat exchanger and a second heat medium-refrigerant heat exchanger, which are adapted to exchange heat between the heat medium and the refrigerant, the air-refrigerant heat exchanger is adapted to exchange heat between the air and one of the refrigerant provided before being decompressed by the decompression device and the refrigerant provided after being decompressed by the decompression device, the first heat medium-refrigerant heat exchanger is adapted to exchange heat between the heat medium and an other of the refrigerant provided before being decompressed by the decompression device and the refrigerant provided after being decompressed by the decompression device, the second heat medium-refrigerant heat exchanger is adapted to exchange heat between the heat medium and the one refrigerant, the cold-heat utilization device is adapted to cause the heat medium to circulate between the cold-heat utilization device and one of the first heat medium-refrigerant heat exchanger and the second heat medium-refrigerant heat exchanger that exchanges heat between the heat medium and the refrigerant provided after being decompressed by the decompression device, and the hot-heat utilization device is adapted to cause the heat medium to circulate between the hot-heat utilization device and one of the first heat medium-refrigerant heat exchanger and the second heat medium-refrigerant heat exchanger that exchanges heat between the heat medium and the refrigerant provided before being decompressed by the decompression device.

12. The refrigeration cycle device according to claim 1, further comprising
a second heat medium-refrigerant heat exchanger that exchanges heat between the heat medium and the refrigerant, wherein
the heat medium-refrigerant heat exchanger is a first heat medium-refrigerant heat exchanger,
in the heat-medium cooling mode, the refrigerant flow switching device valve causes the refrigerant provided before being decompressed by the decompression device to flow into the second heat medium-refrigerant heat exchanger, and the heat-medium flow switching valve causes the heat medium to circulate between the second heat medium-refrigerant heat exchanger and the hot-heat utilization device, and
in the heat-medium heating mode, the refrigerant flow switching valve causes the refrigerant provided after being decompressed by the decompression device to flow into the second heat medium-refrigerant heat exchanger, and the heat-medium flow switching valve causes the heat medium to circulate between the second heat medium-refrigerant heat exchanger and the cold-heat utilization device.

13. The refrigeration cycle device according to claim 12, further comprising:
a first heat-medium pump adapted to draw and discharge the heat medium circulating through the first heat medium-refrigerant heat exchanger;
a second heat-medium pump adapted to draw and discharge the heat medium circulating through the second heat medium-refrigerant heat exchanger;
a compressor control unit that temporarily stops an operation of the compressor when the heat-medium cooling mode and the heat-medium heating mode are switched; and
a pump control unit that maintains at least one of the first heat-medium pump and the second heat-medium pump when the heat-medium cooling mode and the heat-medium heating mode are switched.

14. The refrigeration cycle device according to claim 11, further comprising a heat-medium flow-rate control unit that increases or decreases a flow rate of the heat medium circulating through the second heat medium-refrigerant heat exchanger in an operating state in which a temperature of the refrigerant having heat exchanged in the air-refrigerant heat exchanger falls below a freezing point.

15. The refrigeration cycle device according to claim 11, wherein the air-refrigerant heat exchanger and the second heat medium-refrigerant heat exchanger are disposed in series with respect to a refrigerant flow, the refrigeration cycle device further comprising
a variable throttle capable of switching a refrigerant flow path, located between the air-refrigerant heat exchanger and the second heat medium-refrigerant heat exchanger, to a fully-opened state or a throttled state.

16. The refrigeration cycle device according to claim 1, further comprising:
an internal heat exchanger including: a high-pressure side refrigerant flow path through which the refrigerant having heat exchanged in the air-refrigerant heat exchanger flows in the heat-medium cooling mode; and a low-pressure side refrigerant flow path through which the refrigerant having heat exchanged in the heat medium-refrigerant heat exchanger flows in the heat-medium cooling mode, the internal heat exchanger being adapted to exchange heat between the refrigerant flowing through the high-pressure side refrigerant flow path and the refrigerant flowing through the low-pressure side refrigerant flow path, wherein
the low-pressure side refrigerant flow path is disposed between the refrigerant flow switching valve and the compressor.

17. The refrigeration cycle device according to claim 16, further comprising
a decompression refrigerant flow switching valve adapted to switch a flow of the refrigerant such that the heat-medium cooling mode and the heat-medium heating mode have the same flow direction of the refrigerant at the decompression device, wherein
the decompression refrigerant flow switching valve is disposed between the air-refrigerant heat exchanger and the heat medium-refrigerant heat exchanger, and
the high-pressure side refrigerant flow-path is disposed between the air-refrigerant heat exchanger and the decompression refrigerant flow switching valve.

18. The refrigeration cycle device according to claim 16, further comprising
a decompression refrigerant flow switching valve adapted to switch a flow of the refrigerant such that the heat-medium cooling mode and the heat-medium heating mode have the same flow direction of the refrigerant at the decompression device, wherein
the decompression refrigerant flow switching valve is disposed between the air-refrigerant heat exchanger and the heat medium-refrigerant heat exchanger, and
the high-pressure side refrigerant flow-path is disposed between the decompression refrigerant flow switching valve and the decompression device.

19. The refrigeration cycle device according to claim 1, wherein
the refrigerant flow switching valve is adapted to switch a flow of the refrigerant such that the air-refrigerant heat exchanger is positioned on an upstream side of the flow of the refrigerant with respect to the decompression device and that the heat medium-refrigerant heat exchanger is positioned on a downstream side of the flow of the refrigerant with respect to the decompression device when frost adhering to the air-refrigerant heat exchanger needs to be melted.

20. The refrigeration cycle device according to claim 19, further comprising:
- a heat-medium flowing device through which the heat medium is capable of circulating; and
- a heat-medium circulating device that causes the heat medium to circulate between the heat medium-refrigerant heat exchanger and the heat-medium flowing device when frost adhering to the air-refrigerant heat exchanger needs to be melted.

21. The refrigeration cycle device according to claim 19, further comprising:
- a bypass switching valve configured to switch a flow of the heat medium such that the heat medium circulating through the hot-heat utilization device bypasses the heat medium-refrigerant heat exchanger when frost adhering to the air-refrigerant heat exchanger needs to be melted.

* * * * *